(12) United States Patent
Dawson et al.

(10) Patent No.: US 12,539,522 B2
(45) Date of Patent: Feb. 3, 2026

(54) AUTOMATED MOBILE SPRAYER SPRAYING AND NAVIGATION

(71) Applicant: Graco Minnesota Inc., Minneapolis, MN (US)

(72) Inventors: Charles W. Dawson, Otsego, MN (US); Barry W. Mattson, Otsego, MN (US); Nicholas H. Reath, Anoka, MN (US); Dale C. Pemberton, Big Lake, MN (US); John P. Saunders, Brooklyn Park, MN (US); Andrew V. Lindenfelser, Elk River, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 221 days.

(21) Appl. No.: 17/782,424

(22) PCT Filed: Dec. 4, 2020

(86) PCT No.: PCT/US2020/063262
§ 371 (c)(1),
(2) Date: Jun. 3, 2022

(87) PCT Pub. No.: WO2021/113609
PCT Pub. Date: Jun. 10, 2021

(65) Prior Publication Data
US 2023/0009566 A1 Jan. 12, 2023

Related U.S. Application Data

(60) Provisional application No. 62/944,695, filed on Dec. 6, 2019, provisional application No. 62/944,708, filed (Continued)

(51) Int. Cl.
B05B 13/00 (2006.01)
B05B 12/12 (2006.01)
(Continued)

(52) U.S. Cl.
CPC .......... *B05B 13/005* (2013.01); *B05B 12/124* (2013.01); *B05B 12/18* (2018.02);
(Continued)

(58) Field of Classification Search
CPC ..... B05B 13/005; B05B 12/124; B05B 12/16; B05B 12/18; B05B 12/34; B05B 15/652
See application file for complete search history.

(56) References Cited

U.S. PATENT DOCUMENTS 1,001,352 A   8/1911   Chadwick
1,440,147 A   12/1922  Heinrich
(Continued)

FOREIGN PATENT DOCUMENTS

CA   2242838 A1   1/2000
CN   1228365 A    9/1999
(Continued)

OTHER PUBLICATIONS

International Preliminary Report on Patentability for PCT Application No. PCT/US2020/063257, Dated Jun. 16, 2022, pp. 7.
(Continued)

*Primary Examiner* — Dah-Wei D. Yuan
*Assistant Examiner* — Stephen A Kitt
(74) *Attorney, Agent, or Firm* — Kinney & Lange, P.A.

(57) ABSTRACT

An automated mobile sprayer (AMS) (12) is configured to apply stripes of fluid to target surfaces to coat those target surfaces with the fluid. A control module (24) of the AMS (12) controls movement and spraying by the AMS. The control module (24) causes the AMS (12) to follow a target surface based on distance data from distance sensors configured to detect the target surface.

18 Claims, 20 Drawing Sheets

Related U.S. Application Data on Dec. 6, 2019, provisional application No. 62/944,714, filed on Dec. 6, 2019, provisional application No. 62/944,754, filed on Dec. 6, 2019, provisional application No. 62/962,005, filed on Jan. 16, 2020.

(51) Int. Cl.
  *B05B 12/16* (2018.01)
  *B05B 12/18* (2018.01)
  *B05B 12/34* (2018.01)
  *B05B 15/652* (2018.01)

(52) U.S. Cl.
  CPC ............ *B05B 12/34* (2018.02); *B05B 15/652* (2018.02); *B05B 12/16* (2018.02)

(56) References Cited

U.S. PATENT DOCUMENTS

| | | | |
|---|---|---|---|
| 2,172,193 | A | 9/1939 | Downs |
| 3,155,346 | A | 11/1964 | Hubert et al. |
| 3,219,276 | A | 11/1965 | Norris |
| 3,274,860 | A | 9/1966 | Gauthier et al. |
| 3,452,745 | A | 7/1969 | Hutchinson et al. |
| 3,863,393 | A | 2/1975 | Goff |
| 3,915,389 | A | 10/1975 | Updegrave |
| 4,048,956 | A | 9/1977 | Estebanez et al. |
| 4,795,111 | A | 1/1989 | Moller |
| 4,838,492 | A | 6/1989 | Berry |
| 5,230,739 | A | 7/1993 | Bartow |
| 5,358,568 | A | 10/1994 | Okano et al. |
| 5,419,734 | A | 5/1995 | Van |
| 5,901,720 | A | 5/1999 | Lange |
| 5,935,657 | A | 8/1999 | Melendez |
| 5,968,271 | A | 10/1999 | Maxwell et al. |
| 6,096,132 | A | 8/2000 | Kaiba et al. |
| 6,264,115 | B1 | 7/2001 | Liska et al. |
| 6,544,336 | B1 | 4/2003 | Lopes |
| 6,626,375 | B1 | 9/2003 | Ireland |
| 6,655,606 | B2 | 12/2003 | Earl |
| 6,745,955 | B2 | 6/2004 | Kronz |
| 6,932,280 | B2 | 8/2005 | Crouch |
| 7,267,300 | B2 | 9/2007 | Heath et al. |
| 7,717,356 | B2 | 5/2010 | Petersen |
| 7,878,096 | B2 | 2/2011 | Banks |
| 8,267,332 | B1 | 9/2012 | Jones et al. |
| 8,298,347 | B2 | 10/2012 | MacNeil et al. |
| 8,967,029 | B1 | 3/2015 | Calvert |
| 9,192,952 | B2 | 11/2015 | Becker et al. |
| 9,302,286 | B2 | 4/2016 | Morton |
| 9,382,003 | B2 | 7/2016 | Burema et al. |
| 9,393,594 | B2 | 7/2016 | Logan et al. |
| 9,522,412 | B2 | 12/2016 | Rina |
| 9,610,595 | B2 | 4/2017 | Peterson et al. |
| 9,611,038 | B2 | 4/2017 | Dahlstrom |
| 9,657,819 | B2 | 5/2017 | Sebert |
| 9,776,200 | B2 | 10/2017 | Busby et al. |
| 10,011,352 | B1 | 7/2018 | Dahlstrom |
| 10,124,359 | B2 | 11/2018 | Raman et al. |
| 10,399,676 | B2 | 9/2019 | Dahlstrom |
| 10,478,841 | B2 | 11/2019 | Harris |
| 10,526,083 | B2 | 1/2020 | Shaw |
| 11,065,636 | B2 | 7/2021 | Fideler et al. |
| 11,173,511 | B2 | 11/2021 | Thompson et al. |
| 11,235,890 | B1 | 2/2022 | Dahlstrom et al. |
| 11,635,526 | B2 | 4/2023 | Macvittie et al. |
| 2003/0085319 | A1 | 5/2003 | Wagner et al. |
| 2004/0058141 | A1 | 3/2004 | Shutic et al. |
| 2007/0000442 | A1 | 1/2007 | Schucker |
| 2008/0251010 | A1 | 10/2008 | Atwood |
| 2010/0143089 | A1* | 6/2010 | Hvass .................... G05D 1/027 414/754 |
| 2011/0212254 | A1 | 9/2011 | Morton |
| 2012/0138207 | A1 | 6/2012 | Ortlieb et al. |
| 2012/0219699 | A1 | 8/2012 | Pettersson et al. |
| 2013/0134254 | A1 | 5/2013 | Moore |
| 2013/0236644 | A1 | 9/2013 | Logan et al. |
| 2015/0274294 | A1 | 10/2015 | Dahlstrom |
| 2015/0344136 | A1 | 12/2015 | Dahlstrom |
| 2016/0082460 | A1 | 3/2016 | McMaster et al. |
| 2016/0121486 | A1* | 5/2016 | Lipinski ............. B05B 13/0431 427/427.3 |
| 2016/0207625 | A1 | 7/2016 | Judas et al. |
| 2016/0214132 | A1 | 7/2016 | Morton |
| 2016/0318607 | A1 | 11/2016 | Desai et al. |
| 2017/0056908 | A1 | 3/2017 | Logan |
| 2017/0080438 | A1 | 3/2017 | Storr |
| 2017/0200921 | A1 | 7/2017 | Zhang et al. |
| 2017/0252765 | A1 | 9/2017 | Medard et al. |
| 2017/0259920 | A1 | 9/2017 | Lai et al. |
| 2018/0036747 | A1 | 2/2018 | Orla-jensen et al. |
| 2018/0043386 | A1 | 2/2018 | Busby et al. |
| 2018/0093289 | A1* | 4/2018 | Raman ................. G05D 1/0234 |
| 2018/0169688 | A1 | 6/2018 | Medard et al. |
| 2018/0281012 | A1 | 10/2018 | Telleria et al. |
| 2018/0291860 | A1 | 10/2018 | Gopal et al. |
| 2018/0318865 | A1* | 11/2018 | Harvison .................. B05C 1/16 |
| 2019/0002100 | A1 | 1/2019 | Zhao |
| 2019/0247877 | A1 | 8/2019 | Fideler et al. |
| 2019/0255551 | A1 | 8/2019 | Hargadon |
| 2019/0291860 | A1 | 9/2019 | Morgan |
| 2019/0365166 | A1 | 12/2019 | Chao |
| 2019/0366375 | A1 | 12/2019 | Thompson et al. |
| 2019/0374966 | A1 | 12/2019 | Thompson et al. |
| 2019/0388926 | A1* | 12/2019 | Raman ................. B05B 12/1454 |
| 2020/0116484 | A1 | 4/2020 | Agouridis et al. |
| 2020/0122178 | A1 | 4/2020 | Logan |
| 2022/0390617 | A1 | 12/2022 | Macvittie et al. |
| 2023/0221447 | A1 | 7/2023 | Macvittie et al. |

FOREIGN PATENT DOCUMENTS

| | | | |
|---|---|---|---|
| CN | 1620341 | A | 5/2005 |
| CN | 101396682 | A | 4/2009 |
| CN | 101977695 | A | 2/2011 |
| CN | 201826508 | U | 5/2011 |
| CN | 202391085 | U | 8/2012 |
| CN | 103153483 | A | 6/2013 |
| CN | 203008337 | U | 6/2013 |
| CN | 103317846 | A | 9/2013 |
| CN | 203764463 | U | 8/2014 |
| CN | 104131686 | A | 11/2014 |
| CN | 104343230 | A | 2/2015 |
| CN | 104512551 | A | 4/2015 |
| CN | 104989086 | A | 10/2015 |
| CN | 105312196 | A | 2/2016 |
| CN | 105537039 | A | 5/2016 |
| CN | 105882973 | A | 8/2016 |
| CN | 106114836 | A | 11/2016 |
| CN | 108575955 | * | 9/2018 |
| CN | 110191762 | A | 8/2019 |
| DE | 102018203569 | A1 | 9/2019 |
| EP | 0153840 | A1 | 9/1985 |
| EP | 3549677 | A1 | 10/2019 |
| JP | 59109272 | A | 6/1984 |
| JP | 62079865 | A | 4/1987 |
| JP | 63069559 | A | 3/1988 |
| JP | S6369559 | A | 3/1988 |
| JP | H0524584 | A | 2/1993 |
| JP | 09271698 | A | 10/1997 |
| JP | H09271698 | A | 10/1997 |
| JP | 2012126216 | A | 7/2012 |
| KR | 20050020335 | A | 3/2005 |
| KR | 100699129 | B1 | 3/2007 |
| KR | 20090090569 | A | 8/2009 |
| KR | 101500876 | B1 | 3/2015 |
| WO | 9820982 | A1 | 5/1998 |
| WO | 9834734 | A1 | 8/1998 |
| WO | 0134309 | A2 | 5/2001 |
| WO | 2012059868 | A1 | 5/2012 |
| WO | 2015150529 | A1 | 10/2015 |
| WO | 2016192024 | A1 | 12/2016 |
| WO | 2017145183 | A1 | 8/2017 |
| WO | 2018136498 | A1 | 7/2018 |

(56) References Cited

FOREIGN PATENT DOCUMENTS

| WO | 2018136499 A1 | 7/2018 |
| WO | 2019016016 A1 | 1/2019 |
| WO | 2020224075 A1 | 11/2020 |

OTHER PUBLICATIONS

International Preliminary Report on Patentability for PCT Application No. PCT/US2020/063262, Dated Jun. 16, 2022, pp. 7.
First Chinese Office Action for CN Application No. 202080094470.2, Dated Apr. 10, 2023, pp. 27.
Communication Pursuant to Article 94(3) EPC for EP Application No. 20834023.2, Dated May 26, 2023, pp. 4.
Second Chinese Office Action for CN Application No. 202080094470.2, Dated Oct. 11, 2023, pp. 9.
International Search Report and Written Opinion for PCT Application No. PCT/US2020/063257, Dated Apr. 13, 2021, 11 Pages.
International Search Report and Written Opinion for PCT Application No. PCT/US2020/063262, Dated Mar. 29, 2021, 10 Pages.
Second Communication Pursuant to Article 94(3) EPC for EP Application No. 20834023.2, Dated Feb. 13, 2024, pp. 5.
Third Communication Pursuant to Article 94(3) EPC for EP Application No. 20834023.2, Dated Aug. 16, 2024, pp. 4.
Extended European Search Report for EP Application No. 18741037.8, Dated Oct. 1, 2020, pp. 8.
First Chinese Office Action for CN Application No. 2018800071408, Dated Oct. 13, 2020, pp. 28.
First Chinese Office Action for CN Application No. 2020800844032, Dated Mar. 28, 2023, pp. 26.
First Chinese Office Action for CN Application No. 202210903942.5, Dated Apr. 14, 2023, pp. 29.
International Search Report and Written Opinion for PCT Application No. PCT/US2018/014027 dated May 9, 2018, pp. 40.

* cited by examiner

AUTOMATED MOBILE SPRAYER SPRAYING AND NAVIGATION

CROSS-REFERENCE TO RELATED APPLICATION(S)

This application claims the benefit of U.S. Provisional Application No. 62/944,708 filed Dec. 6, 2019 and entitled "AUTOMATED MOBILE SPRAYER VOID SPRAYING AND NAVIGATION," and claims the benefit of U.S. Provisional Application No. 62/944,754 filed Dec. 6, 2019 and entitled "TRANSITION SPRAYING AND NAVIGATION FOR AN AUTOMATED MOBILE SPRAYER," and claims the benefit of U.S. Provisional Application No. 62/944,714 filed Dec. 6, 2019 and entitled "OVERSPRAY MITIGATION APPARATUS," and claims the benefit of U.S. Provisional Application No. 62/944,695 filed Dec. 6, 2019 and entitled "SPRAY ORIENTATION ADJUSTMENT FOR AN AUTOMATED MOBILE SPRAYER," and claims the benefit of U.S. Provisional Application No. 62/962,005 filed Jan. 16, 2020 and entitled "NON-SPRAY AREA IDENTIFICATION AND NAVIGATION FOR AN AUTOMATED MOBILE SPRAYER," the disclosures of which are hereby incorporated by reference in their entirety.

BACKGROUND

This disclosure relates generally to mobile fluid spraying systems. More specifically, this disclosure relates to automated mobile painting systems.

Fluid spray systems produce an atomized fluid spray fan and apply the spray fan to a surface. The spray fan is typically in a horizontal orientation or a vertical orientation. In the horizontal orientation the fan is swept across the surface in vertical passes. In the vertical orientation the fan is swept across the surface in horizontal passes. As such, the spray fan is oriented orthogonal to the sweep direction. Typically, a user operates a spray gun to apply the fluid to the surface.

Automated painting systems are typically used to paint components, such as doors and panels. The autonomous painting systems utilize a robotic arm that moves through three-dimensional space to apply paint to the component. The robotic arms are complex and require multiple joints to provide the degree of freedom necessary to coat the components. Moreover, the robotic arm requires the component to move to a position where the arm can reach the component, as a base of the robotic arm is fixed on a factory floor.

SUMMARY

According to one aspect of the disclosure, an automated mobile sprayer (AMS) configured to spray fluids onto a target surface includes a mobile base having a lateral axis and a longitudinal axis; a spray module supported by the mobile base, the spray module movable along a vertical axis relative to the base; a nozzle attached to the spray module and configured to spray the fluid longitudinally towards the target surface; a plurality of distance sensors oriented longitudinally and configured to generate distance data; a navigation sensor configured to generate orientation data; and a control module configured to drive the AMS laterally relative to the target surface based on the distance data from the plurality of distance sensors, to detect a void in the target surface based on the distance data, and to drive the AMS laterally relative to the void based on the orientation data from the navigation sensor.

According to an additional or alternative aspect of the disclosure, a method includes sensing, by a distance sensor, a distance between a target surface and an automated mobile sprayer (AMS); shifting the AMS laterally relative to the target surface in a first lateral direction and maintaining a spacing between the AMS and the target surface based on distance data from the distance sensor and applying spray fluid to the target surface by the AMS; detecting, by a control module, a depth change in the target surface based on the distance data from the distance sensor; and stopping spraying by the AMS at the depth change.

According to another additional or alternative aspect of the disclosure, a method includes driving an automated mobile sprayer (AMS) in a first lateral direction relative to a target surface according to a wall-follow routine, wherein a distance between the AMS and the target surface is maintained based on distance data generated by a distance sensor of the AMS; driving the AMS in the first lateral direction across a void in the target surface based on navigation data generated by a navigation sensor of the AMS; and driving the AMS in the first lateral direction according to the wall-follow routine based on the AMS having passed over the void.

According to yet another additional or alternative aspect of the disclosure, an automated mobile sprayer (AMS) configured to spray fluids onto a target surface includes a mobile base having a lateral axis and a longitudinal axis; a spray module supported by the mobile base, the spray module movable along a vertical axis relative to the mobile base and the target surface; a nozzle attached to the spray module and configured to spray the fluid longitudinally towards the target surface; a plurality of distance sensors configured to generated distance data regarding a distance to a transition of the target surface; a navigation sensor configured to generate orientation data; and a control module. The control module is configured to receive the distance data from the plurality of distance sensors; determine a transition type based on the distance data; and control movement of the AMS and spraying by the AMS relative to the transition based on the transition type.

According to yet another additional or alternative aspect of the disclosure, a method includes shifting an automated mobile sprayer (AMS) laterally relative to a target surface; generating, by a distance sensor disposed on the AMS, distance data regarding a distance to a transition in the target surface; determining, by a control module of the AMS, a transition type based on the distance data; and pivoting the AMS relative to the transition and applying fluid to the transition by the AMS based on the transition type.

According to yet another additional or alternative aspect of the disclosure, an automated mobile sprayer (AMS) is configured to spray fluids onto a target surface and includes a mobile base; a spray module supported by the mobile base, the spray module movable along a vertical axis relative to the base and the target surface and between an upper travel limit and a lower travel limit; a nozzle attached to the spray module and configured to spray the fluid; and an actuator interfacing with the nozzle to tilt the nozzle from a normal orientation to an angled orientation relative to the normal orientation to apply spray fluid to a portion of the target surface disposed one of above the upper travel limit and below the lower travel limit.

According to yet another additional or alternative of the disclosure, a method of spraying fluid onto a target surface with an automated mobile sprayer includes driving a spray module in a first direction along a vertical axis to apply a vertical fluid stripe to the target surface; and actuating the spray module from a normal orientation, where a nozzle of the spray module is positioned to emit spray along a spray axis orthogonal to the target surface, to a tilted orientation, where the nozzle is positioned to emit spray along a spray axis non-orthogonal to the target surface, such that the spray module applies fluid one of above and below a travel limit of the spray module.

According to yet another additional or alternative aspect of the disclosure, an overspray mitigation assembly for a sprayer configured to generate and apply a spray of fluid to a target surface includes a chamber; a sensor disposed in the chamber; a filter disposed upstream of the chamber; and an air passage extending between the filter and the chamber, wherein a flow compressed air flows through the filter and the air passage to the chamber and flows through the chamber and out an open end of the chamber.

According to yet another additional or alternative aspect of the disclosure, an automated mobile sprayer (AMS) configured to spray fluids onto a target surface includes a mobile base; a spray module supported by the mobile base, the spray module movable along a vertical axis relative to the base and the target surface; a nozzle attached to the spray module and configured to spray the fluid; a distance sensor disposed on the AMS and configured to generate distance data regarding a spacing between an object and the AMS; and an overspray mitigation assembly associated with the distance sensor and configured to shield the distance sensor from overspray.

According to yet another additional or alternative aspect of the disclosure, an automated mobile sprayer (AMS) is configured to spray fluids onto a target surface and includes a mobile base; a spray module supported by the mobile base, the spray module movable along a vertical axis relative to the base and the target surface and between an upper travel limit and a lower travel limit; a nozzle attached to the spray module and configured to spray the fluid; and an actuator interfacing with the nozzle to tilt the nozzle from a normal orientation to an angled orientation relative to the normal orientation to apply spray fluid to a portion of the target surface disposed one of above the upper travel limit and below the lower travel limit.

According to yet another additional or alternative aspect of the disclosure, a method of spraying fluid onto a target surface with an automated mobile sprayer includes driving a spray module in a first direction along a vertical axis to apply a vertical fluid stripe to the target surface; and actuating the spray module from a normal orientation, where a nozzle of the spray module is positioned to emit spray along a spray axis orthogonal to the target surface, to a tilted orientation, where the nozzle is positioned to emit spray along a spray axis non-orthogonal to the target surface, such that the spray module applies fluid one of above and below a travel limit of the spray module.

According to one aspect of the disclosure, an overspray mitigation assembly for a sprayer configured to generate and apply a spray of fluid to a target surface includes a chamber; a sensor disposed in the chamber; a filter disposed upstream of the chamber; and an air passage extending between the filter and the chamber, wherein a flow compressed air flows through the filter and the air passage to the chamber and flows through the chamber and out an open end of the chamber.

According to another aspect of the disclosure, an automated mobile sprayer (AMS) configured to spray fluids onto a target surface includes a mobile base; a spray module supported by the mobile base, the spray module movable along a vertical axis relative to the base and the target surface; a nozzle attached to the spray module and configured to spray the fluid; a distance sensor disposed on the AMS and configured to generate distance data regarding a spacing between an object and the AMS; and an overspray mitigation assembly associated with the distance sensor and configured to shield the distance sensor from overspray.

DETAILED DESCRIPTION

Figure 1A:
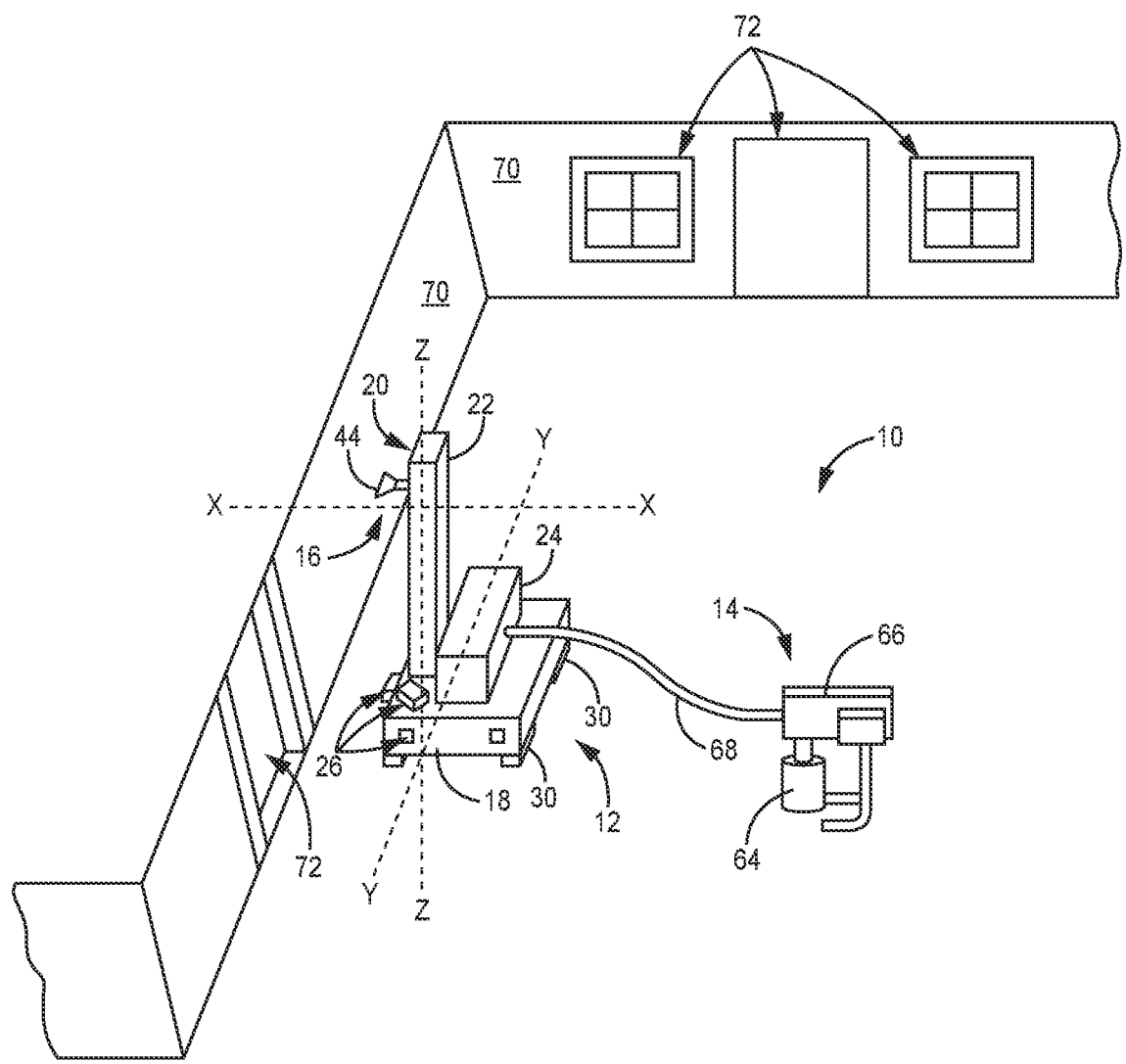
FIG. 1A is a schematic isometric view of an automated mobile spray system.
Figure 1C:
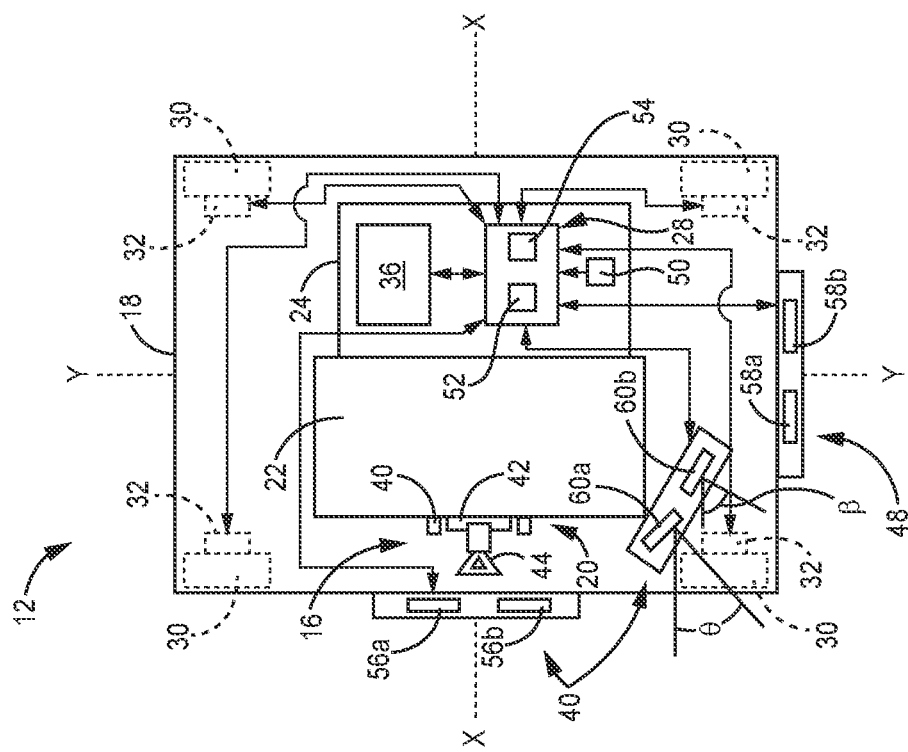
FIG. 1C is a schematic top plan view of an automated mobile sprayer.
Figure 1B:
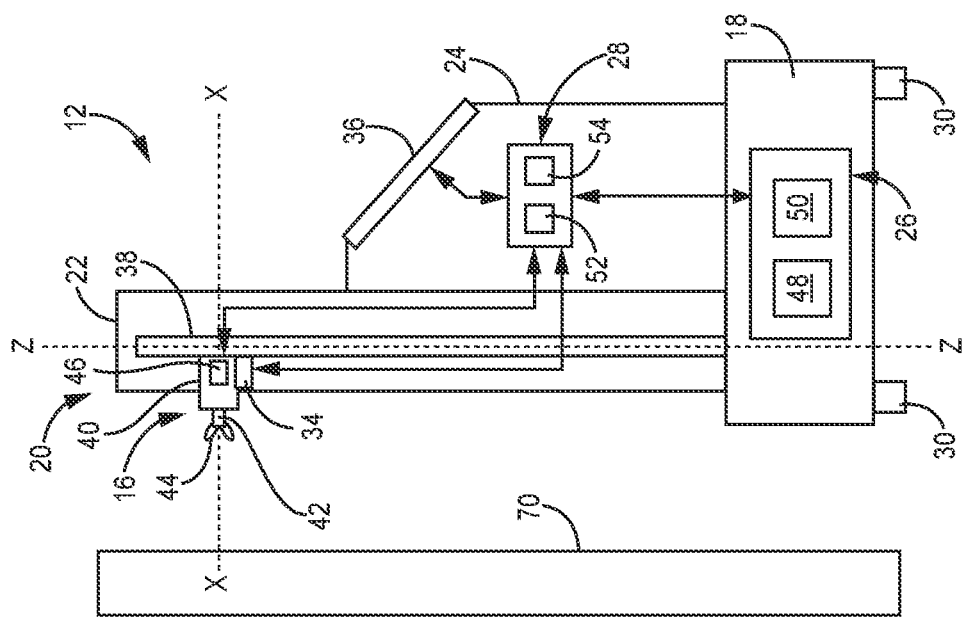
FIG. 1B is a schematic side elevation view of an automated mobile sprayer.

FIG. 1A is an isometric view of automated mobile spraying system 10. FIG. 1B is a side elevation view of automated mobile sprayer (AMS) 12. FIG. 1C is a top plan view of AMS 12. FIGS. 1A-1C will be discussed together. Automated mobile spraying system 10 includes AMS 12 and fluid supply 14 (FIG. 1A). AMS 12 includes spray module 16, base 18, support 20, housing 24, sensors 26, control module 28 (FIGS. 1B and 1C), wheels 30, wheel drives 32 (FIG. 1C), applicator drive 34 (FIG. 1B), and user interface 36 (FIGS. 1B and 1C). Spray module 16 includes module housing 40 (FIGS. 1B and 1C), spray body 42 (FIGS. 1B and 1C), nozzle 44, and control valve 46 (FIG. 1B). Support 20 includes support enclosure 22 and track 38 (FIG. 1B). Sensors 26 include distance sensor(s) 48 (FIGS. 1B-1C) and navigation sensor(s) 50 (FIGS. 1B and 1C). Control module 28 includes memory 52 (FIGS. 1B and 1C) and control circuitry 54 (FIGS. 1B and 1C). Distance sensors 48 include wall sensors 56a, 56b (FIG. 1C) (collectively herein "wall sensors 56"); front sensors 58a, 58b (FIG. 1C) (collectively herein "front sensors 58"); and corner sensors 60a, 60b (FIG. 1C) (collectively herein "corner sensors 60"). Fluid supply 14 includes reservoir 64 (FIG. 1A), pump 66 (FIG. 1A), and supply hose 68 (FIG. 1A). AMS 12 includes longitudinal axis X-X, lateral axis Y-Y, and vertical axis Z-Z that are defined relative to AMS 12.

AMS 12 is a mobile ground vehicle configured to apply a fluid, such as paint, primer, varnish, water, oil, stains, finishes, coatings, and solvents, among others, onto a target surface, such as surface 70. Example surfaces can be interior, such as interior walls, or exterior, such as buildings, among other options. Voids 72 are formed in surface 70.

Base 18 supports the components of AMS 12. Base 18 can be made of any desired material for housing and/or supporting the various components of AMS 12. For example, base 18 can be made from metal and/or composite. In some examples, base 18 is weighted to prevent tipping of AMS 12 during operation. Wheels 30 are disposed on base 18 and provide motive power to base 18. Wheels 30 are oriented to drive AMS 12 parallel to the surface 70 being sprayed. Wheel drives 32 are disposed in base 18 and are operatively connected to wheels 30. As shown, each wheel 30 is associated with an individual wheel motor 32. Each wheel motor 32 individually controls each wheel 30 to drive lateral movement of AMS 12 and to cause turning of AMS 12. In some examples, AMS 12 steers via a skid steer technique, while in other examples AMS 12 steers by wheels 30 reorienting to face various drive directions. Wheel drives 32 can be any suitable motor for driving wheels 30, such as DC electric motors, stepper motors, pneumatic motors, gas-powered motors, brushed electric motors, brushless electric motors, or any other desired motor. Where wheel drives 32 are pneumatic, base 18 can support an air compressor to provide compressed air to drive wheel drives 32. While AMS 12 is described as including wheels 30, it is understood that AMS 12 can include any desired form of locomotion. For example, AMS 12 can include tracks or a combination of wheels and tracks, among other options.

Support 20 extends substantially vertically from base 18. Spray module 16 rides on and is supported by support 20. More specifically, spray module 16 can ride on and be supported by track 38. Support enclosure 22 encloses various components of support 20 and spray module 16. Spray module 16 is disposed at least partially within support enclosure 22. Spray module 16 is supported by base 18 by way of support 20. in some examples, support 20 houses and supports spray module 16 such that spray module 16 can move vertically along axis Z-Z while being prevented from moving relative to support 20 along either axis X-X or axis Y-Y. In one example, track 38 includes grooves that receive projections extending from spray module 16. It is understood, however, that spray module 16 can be supported within support 20 and can translate along support 20 in any desired manner.

Applicator drive 34 is operatively associated with spray module 16 and is configured to drive spray module 16 along axis Z-Z relative to support 20 and surface 70 to apply vertical stripes of fluid to the surface 70. In some examples, applicator drive 34 shifts along axis Z-Z along with spray module 16. For example, applicator drive 34 can include one or more motors, such as electric motors, configured to drive gears interfacing with grooves in a track, such as track 38, formed by or within support 20. In another example, applicator drive 34 can be a piston, such as a pneumatic or hydraulic piston, attached to spray module 16 to drive spray module 16 along axis Z-Z. In some examples, applicator drive 34 is a belt drive that includes a belt, chain, or other flexible member connected to spray module 16 to drive spray module 16. For example, applicator drive 34 can include a motor-driven belt and pulley for driving spray module 16. It is understood, however, that applicator drive 34 can be of any configuration suitable for driving spray module 16 along axis Z-Z.

Spray body 42 is attached to module housing 40 such that spray body 42 is carried by module housing 40. Nozzle 44 extends from spray body 42 towards surface 70. Nozzle 44 is configured to generate a spray of fluid for application to surface 70. It is understood that nozzle 44 can eject the spray in any desired configuration, such as a spray fan or a spray cone, among other options. It is further understood that the desired position of nozzle 44 can include both a coordinate position, such as a distance to surface 70, and an orientation, such as nozzle 44 being orthogonal to surface 70 or at another angle relative to surface 70. In some examples, a non-orthogonal spray fan provides a satisfactory finish, so long as the spray orientation is maintained throughout each spray pass. The quality of the finish applied to surface 70 depends on several factors, such as the distance that nozzle 44 is spaced from surface 70, the desired spray fan width, the thickness of the coating being applied, the type of fluid, the spray pressure, and the size of the orifice in nozzle 44, among other factors.

In some examples, nozzle 44 can be positioned in multiple positions to change the orientation of the spray fan. For example, nozzle 44 can orient the spray fan vertically, such that the spray fan is elongate along vertical axis Z-Z. Spray module 16 is held stationary on vertical axis Z-Z and AMS 12 translates along axis Y-Y relative to surface 70 to apply horizontal stripes. Nozzle 44 can also orient the spray fan horizontally, such that the spray fan is elongate along lateral axis Y-Y. AMS 12 is held stationary on axis Y-Y and spray module 16 translates along axis Z-Z to apply vertical stripes to surface 70. In some examples, nozzle 44 is rotatable between the vertical fan orientation and the horizontal fan orientation.

Control valve 46 controls the emission of fluid spray by nozzle 44. Control valve 46 can be operatively connected to control module 28, either electrically or communicatively. In some examples, control valve 46 is actively controlled by control module 28 such that control module 28 controls spraying by AMS 12. Control valve 46 shifts between a closed position, where the fluid cannot flow to nozzle 44, and an open position, where the fluid flows to nozzle 44 to be ejected as the spray. For example, control valve 46 can include a needle extending to a seat in nozzle 44 and an actuator for actuating the needle. In other examples, AMS 12 does not include a control valve 46 such that nozzle 44 generates the spray fan whenever pump 64 is providing the pressurized fluid. Pump 64 can be operatively connected to control module 28, either electrically or communicatively, such that control module 28 controls spraying by AMS 12.

Control module 28 is configured to store software, implement functionality, and/or process instructions. Control module 28 is configured to perform any of the functions discussed herein, including receiving an output from any sensor referenced herein, detecting any condition or event referenced herein, and controlling operation of any components referenced herein. Control module 28 can be of any suitable configuration for controlling operation of components of AMS 12, gathering data, processing data, etc. For example, control module 28 can receive sensor data from sensors 26, generate drive commands, send the drive commands to wheel drives 32 to cause movement of AMS 12, generate spray commands to cause spray module 16 to emit fluid spray, control movement of spray module 16 along vertical axis Z-Z, and implement routines based on received data, among other options.

Control module 28 is illustrated as disposed within housing 24, but it is understood that control module 28 can be formed by various controllers located within base 18 or at other locations on AMS 12. It is understood that control module 28 can include hardware, firmware, and/or stored software, and control module 28 can be entirely or partially mounted on one or more boards. Control module 28 can be of any type suitable for operating in accordance with the techniques described herein. While control module 28 is illustrated as a single unit, it is understood that control module 28 can be disposed across one or more boards. In some examples, control module 28 can be implemented as a plurality of discrete circuitry subassemblies.

Control module 28 can communicate via wired and/or wireless communications, such as serial communications (e.g., RS-232, RS-505, or other serial communications), digital communications (e.g., Ethernet), Wi-Fi communications, cellular communications, or other wired and/or wireless communications. Memory 52 configured to store software that, when executed by control circuitry 54, causes AMS 12 and fluid supply 14 to execute instructions from control module 28 and apply the fluid to a surface. For example, control circuitry 54 can include one or more of a microprocessor, a controller, a digital signal processor (DSP), an application specific integrated circuit (ASIC), a field-programmable gate array (FPGA), or other equivalent discrete or integrated logic circuitry.

Control module 28 can be configured to store information during operation. Memory 52, in some examples, is described as computer-readable storage media. In some examples, a computer-readable storage medium can include a non-transitory medium. The term "non-transitory" can indicate that the storage medium is not embodied in a carrier wave or a propagated signal. In some examples, memory 52 is a temporary memory, meaning that a primary purpose of memory 52 is not long-term storage. Memory 52, in some examples, is described as volatile memory, meaning that memory 52 does not maintain stored contents when power to control module 28 is turned off. Memory 52, in some examples, also includes one or more computer-readable storage media. Memory 52 can be configured to store larger amounts of information than volatile memory. Memory 52 can further be configured for long-term storage of information. In some examples, memory 52 includes non-volatile storage elements.

User interface 36 can be any graphical and/or mechanical interface that enables user interaction with control module 28. For example, user interface 36 can implement a graphical user interface displayed at a display device of user interface 36 for presenting information to and/or receiving input from a user. User interface 36 can include graphical navigation and control elements, such as graphical buttons or other graphical control elements presented at the display device. User interface 36, in some examples, includes physical navigation and control elements, such as physically-actuated buttons or other physical navigation and control elements. In general, user interface 36 can include any input and/or output devices and control elements that enable user interaction with control module 28. In some examples, user interface 36 can be integrated into AMS 12. For example, user interface 36 can be formed on housing 24 for easy user access. In some examples, user interface 36 can be remote from AMS 12 and communicatively connected to control module 28. User interface 36 can communicate with control module 28 via wired or wireless communications. For example, user interface 36 can be a remote computing device that communicates with control module 28, such as a smartphone or tablet, among other options.

Sensors 26 are configured to generate information regarding the operation and environment of AMS 12. For example, sensors 26 can generate information regarding features such as walls and other structures relative to AMS 12. Distance sensors 48 and navigation sensors 50 are shown. Each of distance sensors 48 and navigation sensors 50 generate sensor data for AMS 12 and provide that sensor data to control module 28. Control module 28 receives sensor data from sensors 26 and is configured to control movement of AMS 12 and spraying by nozzle 44 based, at least partially, on the sensor data. It is understood that sensors 26 can include one or more of distance sensors, location sensors, inertial sensors, and/or optical sensors. For example, sensors 26 can include one or more of a proximity sensor, radar transducer, vibration echo rangefinder (including ultrasonic and/or acoustic rangefinders), laser rangefinder, magnetometer, radar, lidar, GPS receiver chip, accelerometer, gyroscope, compass, and/or camera. Distance sensors 48 can be line-of-sight sensors, such as optical sensors and audio sensors. Optical sensors rely on light to generate the distance data. For example, distance sensors 48 can include one or more of a laser rangefinder, an infrared sensor, a camera, or any other suitable form of distance sensor for generating the distance data. Audio sensors rely on sound to generate the distance data. For example, distance sensor 48 can be an ultrasonic rangefinder or of any other form suitable for generating the distance data. In one example, navigation sensor 50 includes an inertial measurement unit (IMU) having an accelerometer and gyroscope and, in some examples, a magnetometer.

Each of distance sensors 48 and navigation sensors 50 generate sensor data for AMS 12 and provide that sensor data to control module 28. Control module 28 receives sensor data from sensors 26 and is configured to control movement of AMS 12 and spraying by nozzle 44 based, at least in part, on the sensor data. Distance sensors 48 are configured to generate distance data regarding the spacing of objects, such as walls, relative to AMS 12. Navigation sensors 50 are configured generate navigation data regarding the relative orientation and heading of AMS 12.

Wall sensors 56 are distance sensors oriented towards surface 70. Wall sensors 56 can be considered to be oriented generally along the longitudinal axis X-X. As such, wall sensors 56 are oriented longitudinally to generate distance data regarding features spaced from the first longitudinal side of base 18 facing target surface 70. However, wall sensors 56 may not be longitudinally spaced in various embodiments. The distance data generated by wall sensors 56 can also be referred to as spacing distance data.

Wall sensors 56a, 56b are spaced horizontally from nozzle 44 on lateral axis Y-Y. Wall sensors 56a, 56b are disposed on opposite horizontal sides of nozzle 44 to provide locational information to control module 28 regarding the position and orientation of nozzle 44 relative to surface 70. In some examples, AMS 12 includes two wall sensors 56 spaced from nozzle 44. Wall sensors 56 can be spaced equidistantly from nozzle 44, but it is understood that wall sensors 56 can be disposed at any desired location suitable for generating distance data regarding target surface 70, including with non-equidistant spacing relative to the nozzle 44. The spacing between the multiple wall sensors 58a, 58b and the distance from each wall sensor 58a, 58b to nozzle 44 are known by control module 28, and such information can be stored in memory 52. As such, control module 28 can determine the orientation of nozzle 44 relative to surface 70 regardless of the actual positions of wall sensors 56. In some examples, AMS 12 includes more than two wall sensors 56. In the example shown, wall sensors 56a, 56b are mounted on base 18, but it is understood that wall sensors 56a, 56b can be disposed at any desired location on AMS 12 suitable for sensing the target surface 70.

Wall sensors 56 allow control module 28 to determine the orientation of nozzle 44 relative to surface 70. Control module 28 controls movement of AMS 12 such that axis Y-Y of AMS 12 is disposed at a desired orientation, such as parallel, relative to surface 70 during spraying. In some examples, it is desirable to ensure that AMS 12 is parallel relative to surface 70. Control module 28 receives distance data from each wall sensor 56. The distance data provides the spacing between wall sensors 56 and surface 70, which provides the distance D1 between nozzle 44 and surface 70. Control module 28 determines that AMS 12 is disposed parallel to surface 70 when each wall sensor 56a, 56b indicates the same distance to surface 70, within a tolerance determined to be acceptable for a particular application. As such, control module 28 can control movement of AMS 12 based on proximity wall following, discussed further herein as a wall-follow routine.

Front sensors 58 are distance sensors oriented to look ahead of AMS 12 on the travel path of AMS 12. Front sensors 58 can be considered to be oriented generally along the lateral axis Y-Y. As such, front sensors 58 are oriented laterally to generate distance data regarding features spaced from the leading side of base 18. In the example shown, front sensors 58a, 58b are mounted on base 18, but it is understood that front sensors 58a, 58b can be disposed at any desired location on AMS 12 suitable for looking ahead on the travel path of AMS 12. The spacing between the multiple front sensors 58a, 58b and the lateral distance from each front sensors 58a, 58b to nozzle 44 and to the edges of base 18 are known. Front sensors 58a, 58b detect objects, such as other wall surfaces, that AMS 12 is approaching and generate distance data regarding the spacing between front sensors 58 and those objects. The distance data generated by front sensors 58 can also be referred to as front distance data. Control module 28 can utilize the distance data to determine a transition type, determine a void type, and to maneuver AMS 12 through the transition and/or control spraying relative a void, as discussed in more detail below.

In the example shown, AMS 12 includes two front sensors 58. It is understood, however, that AMS 12 can include more than two front sensors 58. For example, a third front sensors 58 can be mounted intermediate two other front sensors 58. In some examples, the third front sensor 58 is aligned with the location of nozzle 44. In some examples, AMS 12 includes a first set of front sensors 58 on a first side of base 18 and oriented in a first direction along axis Y-Y and a second set of front sensors 58 on a second side of base 18 and oriented in a second direction along axis Y-Y, opposite the first direction. The dual-directional front sensors 58 allow for detection of objects regardless of the travel direction of AMS 12 along axis Y-Y.

Corner sensors 60 are distance sensors oriented intermediate wall sensors 56 and front sensors 58. In the example shown, corner sensors 60a, 60b are supported by base 18. It is understood, however, that corner sensors 60 can be disposed at any desired location on AMS 12. Corner sensors 60 are oriented to look along orientations between axis X-X and axis Y-Y. If wall sensors 56 are considered to be looking at 0-degrees and front sensors 58 are considered to be looking at 90-degrees, then corner sensors 60 are positioned to look at angles between 0-degrees and 90-degrees. In some examples, corner sensors 60 include more than one sensor. The multiple corner sensors 60a, 60b can be disposed at different orientations relative each other. In the example shown, corner sensor 60a is disposed at a first angle and corner sensor 60b is disposed at a second angle $\beta$. First angle $\Theta$ and second angle $\beta$ can have different values. Corner sensors 60 are configured to generate and provide distance data to control module 28. The distance data generated by corner sensors 60 can also be referred to as corner distance data.

Each of front sensors 58 and corner sensors 60 look ahead on the travel path of AMS 12 and can identify the locations of transitions prior to AMS 12 reaching the transition. Front sensors 58 and corner sensors 60 can collectively be referred to as travel sensors and the data generated can collectively be referred to as travel distance data.

Navigation sensors 50 are disposed in AMS 12 and configured to provide navigation data to control module 28. For example, navigation sensors 50 can include inertial sensors, magnetometers, compasses, geo-positioning system (GPS) receivers, and various combinations thereof, among other options. The navigation data can provide information regarding the orientation of AMS 12 relative to both itself and the cardinal directions. Control module 28 can control movement of AMS 12 independent from the distance data and based on the navigation data. Fluid supply 14 stores fluid and provides fluid to AMS 12 for application to surface 70. While fluid supply 14 is shown disposed off-board of AMS 12, it is understood that, in some examples, fluid supply 14 can be onboard AMS 12. For example, reservoir 64 and pump 66 can be disposed in housing 24 of AMS 12.

Reservoir 64 is configured to store a bulk volume of fluid. Pump 66 is disposed on reservoir 64 and is configured to draw fluid out of reservoir 64, pressurize the fluid, and drive the fluid downstream to nozzle 44 of AMS 12. Reservoir 64 is any suitable vessel for storing a supply of fluid prior to application. For example, reservoir 64 can be a bucket. Pump 66 can be a piston pump, a diaphragm pump, a peristaltic pump, or any other suitable pump for driving the fluid to nozzle 44 of AMS 12 under pressure. In some examples, pump 66 generates sufficient pressure to cause nozzle 44 to atomize the fluid and generate the spray fan. In other examples, AMS 12 can include a secondary pump configured to generate the high pressure (about 3.45-27.58 MPa (about 500-4,000 psi)) required to atomize the fluid. As such, pump 66 can, in some examples, be a low pressure pump for driving the fluid to the onboard pump, which then generates the desired spray pressure. Supply hose 68 extends from pump 66 to AMS 12 to provide the pressurized fluid to nozzle 44 of AMS 12 for application to surface 70. In some examples, supply hose 68 extends from pump 66 to spray body 42.

During operation, AMS 12 generates and applies sprays of fluid, such as paint, on surfaces that can be difficult for humans to easily access and/or efficiently apply the fluid. In some examples, AMS 12 applies fluid to a surface using a plurality of parallel, raster passes. A raster pass occurs when a first horizontal or vertical stripe is applied to a surface, and the second horizontal or vertical stripe is applied directly adjacent and/or overlapping with the first stipe. Any number of stripes can be applied until the surface 70 is sufficiently coated. In some embodiments, the entirety of the pump 66 and/or the reservoir 64 are carried onboard the AMS 12. For example, one or both of the pump 66 and the reservoir 64 can be supported on the base 18 as the AMS 12 propels itself.

Pump 66 is activated, either autonomously by control module 28 or by the user, and pump 66 draws the fluid from reservoir 64 and drives the fluid downstream to nozzle 44 through supply hose 68. Nozzle 44 generates the spray and traverses surface 70, laterally and/or vertically, to apply the fluid to surface 70. Control module 28 causes the relative movement of nozzle 44 by shifting spray module 16 along axis Z-Z to move nozzle 44 vertically or by driving wheels 30 to shift AMS 12 and thus nozzle 44 laterally along axis Y-Y. Wall sensors 56a, 56b are spaced equidistantly relative to nozzle 44 and generate wall data. The control module 28 controls the positioning of AMS 12 during spraying based on the wall data to ensure that nozzle 44 is properly oriented relative to surface 70 during spraying. An example spray event where AMS 12 applies vertical stripes is discussed further herein. Nozzle 44 is configured to generate a horizontal spray fan when applying vertical stripes of fluid. The horizontal spray fan has elongate sides that extend laterally relative to surface 70 along axis Y-Y.

During operation, a spray routine can be initiated by control module 28 and/or by the user. When the spray routine is implemented, control module 28 positions AMS 12, and thus spray module 16 and nozzle 44, at the desired start location. Control module 28 controls movement of AMS 12 via wheel drives 32. AMS 12 moves such that nozzle 44 is located at the desired distance from and orientation relative to surface 70.

Control module 28 can generate and provide a start spray command to control valve 46 to initiate spraying. The start spray command causes control valve 46 to shift to the open position and open a flow path through nozzle 44, such as by actuating a valve member, such as a needle, to open the flow path. In some examples, control valve 46 includes a solenoid and control module 28 electrically activates the solenoid to shift the position of the valve member. In some examples, the valve is pressure-actuated and control module causes pump 66 to build pressure that causes the valve member to shift open. The fluid flows through the flow path and is ejected as an atomized spray by nozzle 44. To stop spraying, control module 28 can deactivate pump 66 or cause control valve 46 to shift to the closed position, among other options. In some examples, control module 28 can cause the actuator of control valve 46 to shift the valve member to the closed position. In other examples, a spring or other biasing mechanism can cause the valve member to return to the closed position when power is removed from control valve 46.

Control module 28 causes nozzle 44 to move relative to surface 70 by shifting spray module 16 along axis Z-Z to move nozzle 44 vertically or by driving wheels 30 to shift AMS 12 and nozzle 44 laterally along axis Y-Y. For example, control module 28 can provide commands to applicator drive 34 to drive vertical displacement of spray module 16. Control module 28 can provide commands to wheel drives 32 to cause displacement of wheels 30. Control module 28 controls the positioning of AMS 12 during spraying based on data generated by distance sensors 48 and navigation sensors 50 to ensure that nozzle 44 is properly oriented relative to surface 70 during spraying.

Control module 28 controls spraying to apply a smooth and even finish on surface. In some examples, control module 28 controls spraying such that nozzle 44 is in motion relative to surface 70 before any fluid is sprayed from nozzle 44. Beginning spraying when nozzle 44 is in motion decreases or, in some cases, eliminates the unwanted effect caused by spitting, which most commonly occurs as spraying starts and as spraying ends. With nozzle 44 already in motion, any unwanted spray pattern is evenly distributed on surface 70 and can be corrected with subsequent fluid application. To ensure that nozzle 44 is already in motion before spraying is activated, control module 28 can implement a delay between activating wheel drives 32 or applicator drive 34 and opening of control valve 46.

Control module 28 can initially implement a wall-follow routine to control spraying by AMS 12. During the wall-follow routine, AMS 12 drives along axis Y-Y and distance D1 between nozzle 44 and surface 70 is maintained. Control module 28 controls movement of AMS 12 along axis Y-Y based, at least in part, on inputs from wall sensors 56a, 56b to ensure that AMS 12 is properly oriented relative to target surface 70 during spraying. The wall-follow routine thereby includes proximity wall following as the distance between target surface 70 and AMS 12 is maintained. Wall sensors 56a, 56b are spaced relative to nozzle 44 on axis Y-Y. In some examples, wall sensors 56a, 56b can be spaced equidistantly relative to nozzle 44. Where wall sensors 56a, 56b each indicate the same distance to surface 70, then control module 28 determines that nozzle 44 is oriented orthogonal to surface 70 and can further determine the distance D1 that nozzle 44 is spaced from surface 70. If one of wall sensors 56a, 56b indicates a different distance than the other of wall sensors 56a, 56b, then control module 28 can determine that nozzle 44 is obliquely tilted towards whichever wall sensor 56a, 56b indicates a further distance to surface 70 than the other wall sensor 56a, 56b.

Control module 28 can implement corrective action to reorient AMS 12 to the desired spraying position based on the data generated by wall sensors 56a, 56b. For example, control module 28 can command one or more of wheel drives 32 to cause rotation of wheels 30 to reorient AMS 12 to the desired spray position. For example, where wall sensor 56a indicates a greater distance to surface 70 than wall sensor 56b, control module 28 can adjust the orientation of AMS 12 until wall sensors 56a, 56b indicate the same distance, and such that that sensed distance is the desired distance.

While AMS 12 is described as taking corrective action when nozzle 44 is not orthogonal to the surface, it is understood that AMS 12 can maintain nozzle 44 in any desired spray orientation. While the orientation of nozzle 44 is described as based on information from wall sensors 56a, 56b, it is understood that AMS 12 can monitor the orientation of nozzle 44 based on information from any one or more of sensors 26. For example, a single sensor 26 can provide a distance to surface 70, while two or more sensors 26 can provide the orientation of nozzle 44 relative to surface 70. In some examples, additional and/or alternative sensors 26 are mounted to spray module 16 to travel with spray module 16.

Control module 28 is configured to implement a transition routine based on the detection of transitions in surface 70 (e.g., a depth change, a corner, a soffit, a window, a doorway, etc.). In some examples, control module 28 is configured to determine the transition type based on distance data from distance sensors 48. For example, control module 28 can implement a void-crossing routine or a transition maneuver routine, among other options.

Control module 28 is configured to control spraying relative to transitions and to control movement of AMS 12 relative to transitions. For example, the surface 70 surrounding a void (e.g., doorway or window) can be classified as a spray area and the area within the void can be considered a non-spray area. Control module 28 can control spraying such that AMS 12 applies spray fluid within the spray area and does not apply the spray fluid within the non-spray area.

In some examples, control module 28 is configured to implement a transition routine based on detection of a depth change in surface 70, such as based on AMS 12 detecting void 72. For example, distance sensors 48 can indicate a sudden increase in the distance between the surface 70 and AMS 12, indicating the presence of a void 72. In some examples, control module 28 detects an indicator 74 (FIG. 4) positioned relative the void 72 and can determine the presence of the void 72 based on indicator 74. For example, the indicator 74 can be a tape, such as a foil tape configured to be sensed by magnetic sensors or a tape having a visual identifier (e.g., a unique color, pattern, etc.) that can be sensed by optical sensors. It is understood, however, that control module 28 can be configured to detect the depth change in any desired manner.

It is further understood that control module 28 can be configured to implement the transition routine based on the detection of a depth change of any desired magnitude. In some examples, control module 28 implements a void-crossing routine when the depth change exceeds a threshold depth. For example, the threshold depth can be about 2 inches (in.) (5.08 centimeters (cm)), but it is understood that the threshold depth can be set at any desired depth, including less than or greater than 2 inches. The threshold depth can be set by the user, such as via user interface 36, or pre-set and stored in memory 52.

In some examples, control module 28 is configured to monitor the travel path of AMS 12 for features in target surface 70 and implement a wall maneuver routine based on the detected features. For example, control module 28 can detect the presence of a wall transition between two intersecting surfaces based on data from distance sensors 48. Control module 28 can determine the presence of transitions as AMS 12 is traversing target surface 70 and applying fluid to target surface 70. Control module 28 can monitor the detected transition and implement a wall maneuver routine based on detection and identification of the transition. Control module 28 is configured to determine the wall maneuver routine and implement the determined routine based on the type of transition detected. Control module 28 controls movement of AMS 12 and spraying by AMS 12 relative to the transition to cause AMS 12 to shift from being oriented on target surface 70 to being oriented to apply fluid on wall surface that intersects with target surface 70 at the transition.

Control module 28 can initially determine whether the void 72 is a wall transition, where one wall meets another, or a void 72, which is a gap in surface 70 such that the target surface 70 continues on the other side of the gap. For example, the void 72 can be a door or window opening, among other gaps. In some examples, control module 28 can classify the transition as a void based on the depth change falling below an upper threshold depth. For example, a window opening will have a detectable depth while a transition around a corner may not. The upper threshold can be set at any desired level, such as at the maximum operating range of the distance sensor 48, among other options.

Control module 28 can also maneuver AMS 12 to determine the type of transition. For example, control module 28 can drive AMS 12 a set distance on the same heading as surface 70 to probe for the end of the void 72. Control module 28 utilizes the navigation data from navigation sensor 50 to maintain the heading of AMS 12 as AMS 12 moves across void 72. If an exit threshold of void 72 is not detected after traversing the set distance, then control module 28 can classify the transition as a wall transition and not a void. As discussed in more detail below, control module 28 can, in some examples, cause the AMS 12 to pivot into the void 72 to detect any surfaces extending into the void 72 and determine the type of transition. Control module 28 can initiate a wall transition maneuver based on the transition being a wall transition, as discussed in more detail below with regard to FIG. 3.

Figure 2:
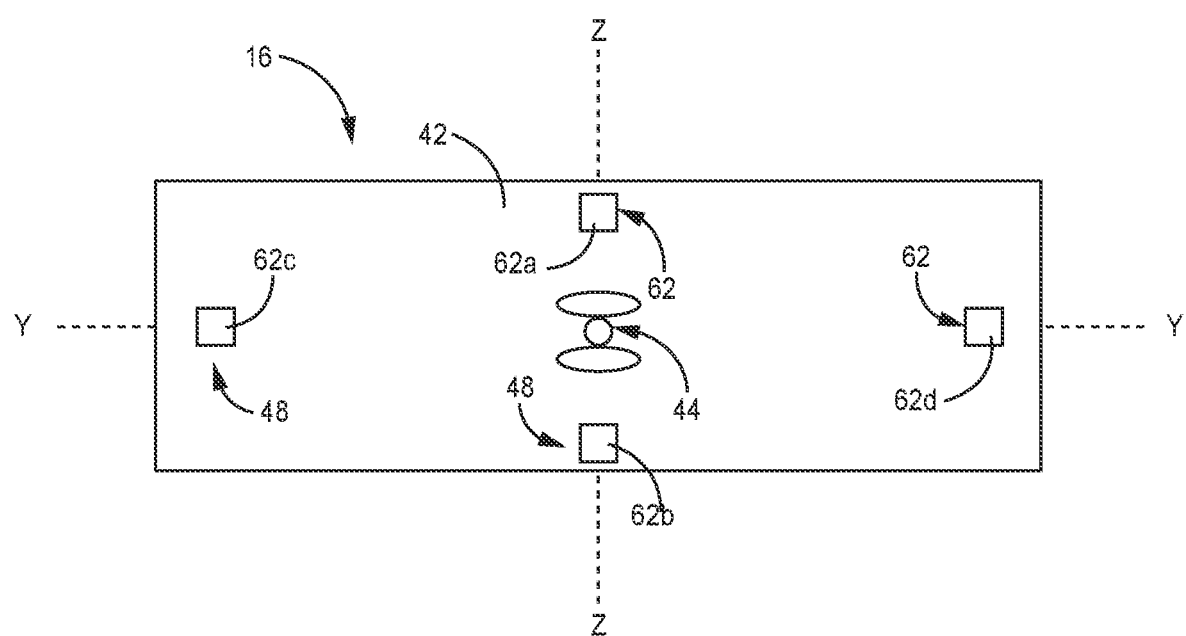
FIG. 2 is a schematic front elevation view of a spray module.

If wall sensors 56 detect surface 70 on the other lateral side of the void 72, then control module 28 can classify the transition as a void and initiate a void-crossing routine. Control module 28 can resume the wall-follow routine on the other side of the void 72 after traversing the void 72. In some examples, control module 28 navigates AMS 12 back to the entrance threshold of the void 72 and probes surface 70 to determine if there are portions of surface 70 at the boundaries of the void 72 that require spraying, such as the area above a doorway or the areas above and below a window opening. For example, control module 28 can determine the presence of areas that require spraying based on data from sensors mounted on spray module 16 to move with spray module 16, such as path sensors 62 (FIG. 2). Control module 28 can cause AMS 12 to proceed through several spray passes without emitting fluid while probing the surface 70. Control module 28 can cause AMS 12 to proceed through spray passes without emitting fluid into the detected void and while spraying the wall surface above, below, left, and/or right, of the detected void 72.

During a void-crossing routine, control module 28 stops spraying by nozzle 44 at the depth change. Control module 28 causes nozzle 44 to traverse the depth change and resume spraying on the other side of the depth change, such as by driving spray module 16 vertically or AMS 12 laterally. The depth change can be detected based on data from distance sensors 48. For example, as AMS 12 shifts laterally, a leading one of wall sensors 56 can indicate a sudden increase in distance, indicating that that wall sensor 56 has passed the entrance threshold of a void. The spacing between sensors and nozzle 44 is known. Control module 28 stops spraying by nozzle 44 prior to nozzle 44 crossing the entrance threshold of the depth change, such as at the interface between void 72 and surface 70. Control module 28 activates wheel drives 32 to drive AMS 12 laterally. Control module 28 can rely on navigation data from navigation sensor to control movement of AMS 12 across the void. The sensor can detect the end or exit threshold of the depth change prior to nozzle 44 passing out of the depth change. Control module 28 resumes spraying by nozzle 44 as nozzle 44 passes the exit threshold of the depth change, such as at the interface between void 72 and surface 70. AMS 12 can then resume spraying on the exit side of the void.

The void-crossing routine facilitates navigation of AMS 12 across depth changes and resume spraying on the other side of the depth change. For example, AMS 12 can encounter a depth change where wall sensors 56 no longer detect surface 70, such as a doorway, for example. The control module 28 causes AMS 12 to stop spraying at the entrance threshold of the depth change. Control module 28 switches from utilizing the distance data to guide AMS 12 to utilizing the navigation data to guide AMS 12. Control module 28 maintains the heading of AMS 12 based on the navigation data and drives AMS 12 across void 72. Control module 28 causes AMS 12 to resume spraying with nozzle 44 having traversed the void 72 and again being aligned with surface 70 and positioned to spray on surface 70.

Control module 28 is described as detecting the depth changes based on data from distance sensors 48. It is understood, however, that the depth changes can be detected in any desired manner. For example, the user can provide void location data to control module 28 regarding the locations of the depth changes. In some examples, the user can input the boundaries of the depth change and control module 28 can implement the void-crossing routine based on those user-input boundaries. In some examples, the user can input the void location data via user interface 36. It is understood, however, that the void location data can be provided to AMS 12 in any desired manner. In other examples, the user can input the approximate location of the depth change. Control module 28 can classify any depth change at that approximate location as a void and initiate the void-crossing routine. The void location data can be stored in memory 52. In some examples, control module 28 can locate and map the depth change and then resume spraying at the location where spraying ceased. Control module 28 can store the location and classification of any depth change in memory 52, which can be utilized by the user for project tracking and management. In some examples, the depth change can be detected based on indicators 74 (FIG. 4) and/or data from path sensors 62 (FIG. 2).

Control module 28 initially implements the wall-follow routine until a depth change is encountered. Control module 28 can switch from controlling movement of AMS 12 based on the distance data from distance sensors 48 to controlling operation of AMS 12 based on the navigation data from navigation sensors 50. Control module 28 can control spraying by nozzle 44 based on inputs from distance sensors 48. The navigation sensors 50 provide the relative orientation of AMS 12 to control module 28, which allows control module 28 to drive AMS 12 on a set heading. Driving AMS 12 on the set heading allows AMS 12 to cross a depth change in surface 70 while maintaining the desired orientation and distance D1 relative to surface 70. In some examples, control module 28 does not rely on distance data or any other detection of surface 70 during the void-crossing routine. Control module 28 can maneuver AMS 12 relative a wall transition based on the navigation data, as discussed in more detail below.

The user can control whether AMS 12 does or does not spray across void 72 during site preparation. For example, the user can modify the depth change to control spraying by AMS 12. In one example, the user can tape a covering over void 72 such that the covering is flush with surface 70, thereby removing the depth change. Such a flush covering can be referred to as a flush tape. The depth change will not be detected and AMS 12 will continue spraying across the depth change. In other examples, the user can tape the covering in the depth change such that the depth change is still present and can be detected, which can be referred to as a deep tape. In such an example, the depth change will be detected and control module 28 can operate AMS 12 according to the void-crossing routine and not cause spraying in the depth change.

AMS 12 provides significant advantages. Navigation sensors 50 and distance sensors 48 allow AMS 12 to navigate the full width of the surface 70 that AMS 12 is spraying regardless of the presence of any voids 72 in the wall. Control module 28 controls movement of AMS 12 based on both a wall-follow routine and a void-crossing routine, which maintains the correct orientation and heading of AMS 12 during spraying and allows AMS 12 to navigate across voids 72 in surface 70. Control module 28 can maintain the heading of AMS 12 based on the navigation data received from navigation sensors 50. As such, control module 28 is not reliant on distance data from distance sensors 48 to navigate AMS 12. Navigating across voids 72 without spraying reduces material waste, avoids spraying at undesired locations, saves costs, and increases spray efficiency. While AMS 12 is described as a ground vehicle, it is understood that AMS 12 can be an aerial vehicle, such as a drone. For example, mobile base 18 can be a drone on which the spray module is mounted and that can maneuver to move the spray module along the vertical and horizontal axes discussed herein.

FIG. 2 is a front elevation view of spray module 16. Spray body 48 and path sensors 62a-62d (collectively herein "path sensors 62") are shown. Path sensors 62 are distance sensors 48 mounted on spray module 16 to move with spray module 16. FIG. 2 is discussed with continued reference to FIGS. 1A-1C.

Path sensors 62 are disposed proximate spray module 16. As shown in FIG. 2, path sensors 62 are mounted to spray module 16. Path sensors 62 can travel with spray module 16 as spray module shifts during spraying. Path sensors 62 are configured to sense surface 70 and generate data regarding a distance to surface 70. While spray module 16 is shown as including multiple ones of path sensors 62, it is understood that spray module 16 can include any desired number of path sensors 62, such as one, two, three or more. In some examples, spray module 16 includes a single sensor configured to sense slightly forward of the position of nozzle 44 in the travel direction of base 18 and/or spray module 16. For example, where AMS 12 is configured to travel towards path sensor 62c, path sensor 62c can be the single path sensor 62. It is understood, however, that the single path sensor 62 can be disposed at any desired location relative to nozzle 44 that allows path sensor 62 to look ahead on surface 70 in the travel direction of base 18.

Path sensors 62a, 62b are disposed on opposite vertical sides of nozzle 44. Path sensor 62a is disposed above nozzle 44. Path sensor 62a generates data regarding the portion of surface 70 yet to be sprayed and disposed in the spray path of nozzle 44 as nozzle 44 moves upwards along vertical axis Z-Z. Path sensor 62b is disposed below nozzle 44 such that path sensor 62b generates data regarding the portion of surface 70 yet to be sprayed and in the spray path of nozzle 44 as nozzle 44 moves downward along vertical axis Z-Z. Path sensors 62a, 62b further provide data regarding adjacent spray paths when AMS 12 is applying horizontal stripes.

Path sensors 62c, 62d are disposed on opposite lateral sides of nozzle 44. Path sensor 62c is disposed on a first lateral side of nozzle 44. Path sensor 62c generates data regarding the portion of surface 70 offset laterally from the spray path of nozzle 44 when nozzle 44 moves vertically. Path sensor 62c generates data regarding the portion of surface 70 in the spray path of nozzle 44 when AMS 12 applies horizontal stripes. Path sensor 62d is disposed on a second lateral side of nozzle 44. Path sensor 62d generates data regarding the portion of surface 70 offset laterally from the spray path of nozzle 44 when nozzle 44 moves vertically. Path sensor 62d generates data regarding the portion of surface 70 in the spray path of nozzle 44 when AMS 12 applies horizontal stripes. Path sensors 62c, 62d further provide data regarding adjacent spray paths when ASM 12 is applying vertical stripes. Control module 28 can detect the presence of a depth change adjacent to the location where AMS 12 is applying a stripe based on data from path sensors 62c, 62d.

In some examples, path sensors 62 are offset from nozzle 44 by a width equal to or exceeding the width of the spray fan at surface 70. As such, path sensors 62 can be disposed outside of the spray path. The portion of surface 70 offset from the current spray path can be sprayed in a subsequent spray pass. The data generated by path sensors 62 is utilized to detect depth changes in surface 70 prior to that portion of surface 70 being in the spray path of nozzle 44.

During a void-crossing routine, control module 28 can utilize data from one of path sensors 62 to control spraying by nozzle 44 relative to the depth change. For example, when spraying a vertical stripe, a path sensor 62a disposed on spray module 16 can detect the depth change prior to nozzle 44 passing over the depth change. The spacing between the path sensor 62 and nozzle 44 is known. Control module 28 stops spraying by nozzle 44 prior to nozzle 44 crossing the entrance threshold of the depth change, such as at the interface between void 72 and surface 70. The path sensor 62 can detect the end or exit threshold of the depth change prior to nozzle 44 passing out of the depth change. Control module 28 resumes spraying by nozzle 44 as nozzle 44 passes the exit threshold of the depth change, such as at the interface between void 72 and surface 70. After applying the vertical stripe, control module 28 causes AMS 12 to apply an adjacent vertical stripe. Control module 28 activates wheel drives 32 to drive AMS 12 laterally. Control module 28 activates applicator drive 34 and nozzle 44 moves in an opposite vertical direction to apply the adjacent stripe. Control module 28 can utilize data from path sensor 62b as nozzle 44 travels in an opposite direction to apply a stripe adjacent to the first stripe. In some examples, control module 28 determine the locations of entrance and exit thresholds of a void 72 based on an indicator 74 at void 72.

Figure 3:
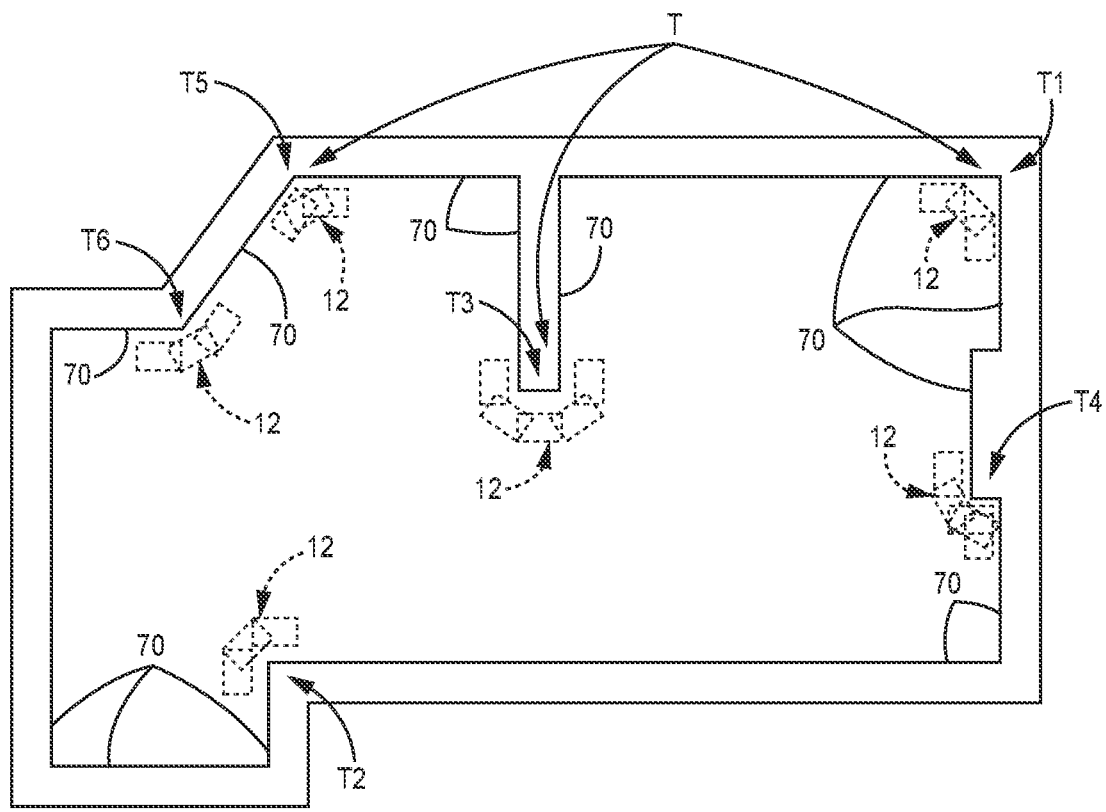
FIG. 3 is a schematic top plan view of a spray environment illustrating various transition types.

FIG. 3 is a top plan view of a floor plan illustrating various transition types. As discussed above, control module 28 controls movement of AMS 12 and spraying by AMS 12 relative to transitions T. FIG. 3 is discussed with continued reference to FIGS. 1A-1C.

Transitions T are formed between the various surfaces 70 forming the spray environment. AMS 12 is configured to detect the transitions, determine the transition type, and apply fluid at the transition based on the determined transition type. Several transition types are shown in FIG. 3, including inside square transition T1, outside square transition T2, outside stub transition T3, bump out transition T4, inside angled transition T5, and outside angled transition T6. It is understood that the spray environment can include additional types of transitions.

Control module 28 is configured to maneuver AMS 12 relative to various types of transitions T and cause AMS 12 to apply fluid spray at the transitions T. FIG. 3 shows, in phantom, examples of various positions of AMS 12 as AMS 12 executes different wall maneuvers based on the differing transition types. The positions shown are positions where AMS 12 pauses movement relative to the transition and applies a fluid stripe, which can also be referred to as a fluid swath.

Wall maneuver routines, which are transition routines where control module 28 maneuvers AMS 12 relative to a transition where two walls come together, are discussed in more detail. AMS 12 initially applied fluid according to the wall-follow routine. Control module 28 monitors the travel path of AMS 12 for wall transitions in target surface 70. Control module 28 is configured to detect transitions as AMS 12 is traversing target surface 70 and applying fluid to target surface 70. Control module 28 is configured to implement a wall maneuver routine based on detection and identification of the transition. For example, control module 28 can determine the transition type based on distance data from one or more of distance sensors 48 and can recall a wall maneuver routine from a maneuver library stored in memory 52 based on the determined transition type. Control module 28 is configured to control movement of AMS 12 and spraying by AMS 12 based on the wall maneuver routine associated with the detected transition. Control module 28 controls movement of AMS 12 and spraying by AMS 12 relative to the transition to cause AMS 12 to shift from being oriented on target surface 70 to being oriented to apply fluid on the transition surface, which is the surface that intersects with target surface 70 at the transition. During the wall maneuver routine, control module 28 initially determines the type of transition based on distance data from distance sensors 48. For example, control module 28 can determine whether the transition is an inside transition, such as inside square transition T1, bump out transition T4, and inside angled transition T5; or an outside transition, such as outside square transition T2, outside stub transition T3, and outside angled transition T6. Control module 28 can recall a transition maneuver from memory 52 based on the identified transition type. For example, memory 52 can include a maneuver library containing various maneuvers associated with various transition types. Control module 28 executes the transition maneuver associated with the identifier transition type to cause AMS 12 to maneuver relative to the transition and apply fluid to the surfaces forming the transition.

Control module 28 locates the transition and identifies the transition type based on distance data from distance sensors 48. Control module 28 can identify the transition as one of an inside transition and an outside transition. Control module 28 is further configured to determine the transition type, such as which one of the possible inside transitions is being encountered.

An inside transition can be identified based on the distance data generated by front sensors 58 and/or corner sensors 60. Both front sensors 58a, 58b indicating the same decreasing distance as AMS 12 shifts laterally towards the transition indicates that the transition is an inside square corner, such as inside square transition T1. Each front sensor 58 indicating different distances as AMS 12 approaches the transition can indicate an inside angled corner, such as inside angled transition T5, or a bump out, such as bump out transition T4.

An outside transition can be identified based on distance data from wall sensors 56 and/or corner sensors 60. For example, the distance data generated by the leading one of wall sensors 56, such as wall sensor 56a, can indicate a sudden increase in distance. That sudden increase can indicate the location of the outside transition. In some examples, the distance data from corner sensors 60 indicates a sudden increase in distance, which can indicate an outside transition.

Distance data generated by corner sensors 60 facilitates identifying both inside and outside transitions. During the wall-follow routine, the distance data generated by corner sensors 60 remains relatively steady. An increase or decrease in the distance indicated by corner sensors 60 can indicate the presence of a transition. Because corner sensors 60 look ahead on target surface 70 along the travel path of AMS 12, the data from corner sensor 60 can indicate the presence and location of a transition prior to AMS 12 reaching the transition. For example, a sudden increase in the distance can indicate an outside transition, while a sudden decrease and/or a steadily decreasing distance can indicate an inside transition. The distance data generated by corner sensors 60 facilitates identification of the transition type. In addition, the distance data generated by corner sensors 60 can be utilized as AMS 12 maneuvers relative to the transition. For example, when AMS 12 is navigating an inside transition, corner sensors 60 continue to generate distance data regarding the transition surface even when front sensors 58 range out or are disposed at too shallow of an angle relative to the transition surface to generate relevant data.

Control module 28 execute a transition maneuver based on the identified transition type. In some examples, control module 28 can recall a wall maneuver routine from memory 52 based on the identified transition type. The wall maneuver routine provides movement commands for the AMS 12 to navigate AMS 12 relative to the transition and spray commands to cause AMS 12 to apply spray fluid at the transition. Control module 28 navigates AMS 12 through the transition maneuver based on sensor data generated by one or both of distance sensors 48 and navigation sensors 50. After AMS 12 executes the transition maneuver, control module 28 can determine whether AMS 12 is positioned on a flat wall or if an additional transition maneuver is required. For example, where the transition is a stub wall, AMS 12 may need to complete one or more additional maneuvers to position on a wall suitable for being according to the wall-follow routine.

After completing the transition maneuver, control module 28 can implement the wall-follow routine to apply fluid to the transition surface after AMS 12. The transition surface becomes the target surface 70 when the transition maneuver is complete.

Control module 28 initially causes AMS 12 to spray according to the wall-follow routine. When a transition is detected, control module 28 determines the transition type and recalls a transition maneuver from memory 52 based on the determined transition type. Control module 28 executes the transition maneuver. The transition maneuver controls both spraying and navigation of AMS 12 through the transition. Control module 28 detects the presence of the transition and identifies the type of transition based on distance data from distance sensors 48. Control module 28 controls movement of AMS 12 during the transition maneuver based on sensor data from one or both of distance sensors 48 and navigation sensor 50. After completing the transition maneuver, control module 28 can implement the wall-follow routine to apply fluid to the transition surface.

AMS 12 provides significant advantages. Navigation sensors 50 and distance sensors 48 allow AMS 12 to identify and navigate any wall transitions encountered during spraying. Control module 28 can identify the location and type of wall transition based on distance data from distance sensors 48. Control module 28 can distinguish between various types of wall transitions based on the distance data generated by distance sensors 48. Memory 52 stores transition maneuvers for use during the transition routine. Control module 28 can recall a wall maneuver routine based on the type of wall transition encountered. The wall maneuver routines provide instructions that control how AMS 12 applies fluid at the transition and how AMS 12 navigates relative to the transition. As such, the wall maneuver routines facilitate AMS 12 autonomously applying fluid while navigating wall transitions present on the site. AMS 12 autonomously identifying and navigating across transitions increase efficiency and reduces material waste. In addition, the transition maneuvers prevent AMS 12 from becoming stuck or otherwise relying on a user during operation, further increasing operational efficiency.

Figure 4:
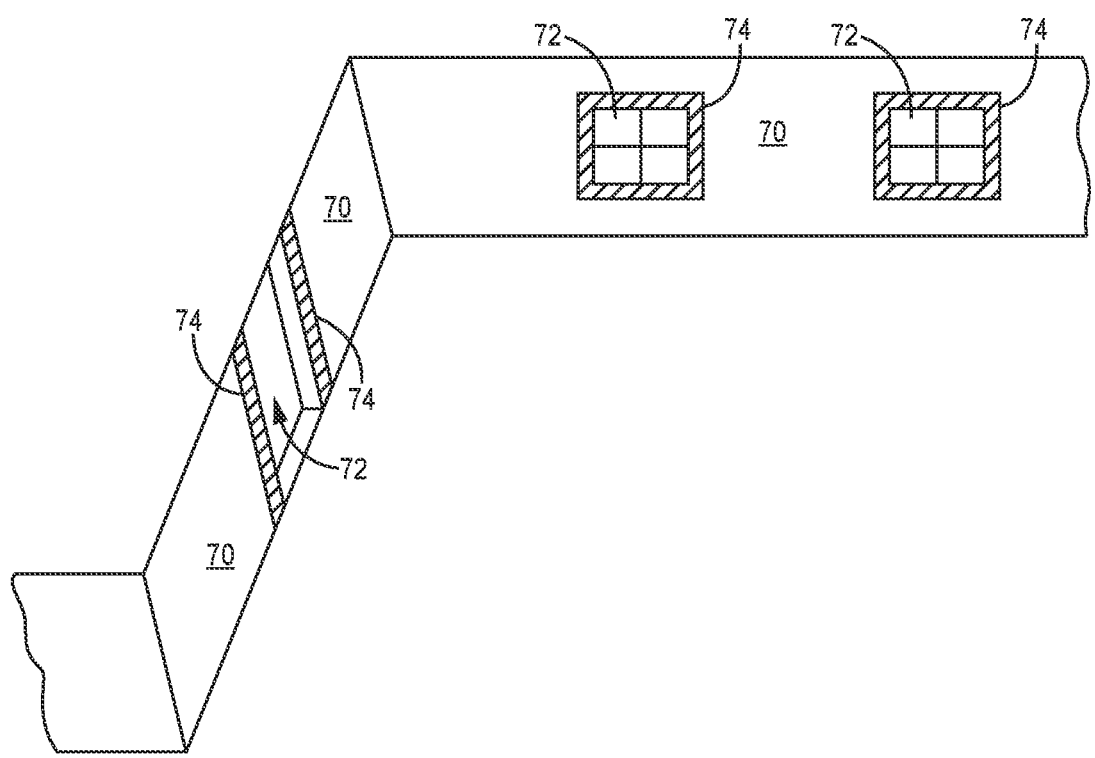
FIG. 4. Is a schematic view of a spray environment showing non-spray areas and indicators.

FIG. 4 is a schematic of a spray area showing non-spray areas and indicators 74. As shown in FIG. 4, indicators 74 can placed relative to non-spray areas. The user can place indicators 74 relative the non-spray areas when preparing the site for spraying. Non-spray areas are those areas of the target surface 70 on which fluid is not meant to be applied. For example, non-spray areas can include voids 72, such as doorways and windows, among other options. Indicators 74 are located proximate the non-spray area to indicate the boundaries of the non-spray area. Control module 28 can be configured to control spraying by AMS 12 and/or movement of AMS 12 relative to the non-spray area based on indicators 74. For example, control module 28 can stop movement and spraying by AMS 12 and await further instructions from the user based on indicator 74. In some examples, indicator 74 can cause the AMS 12 to traverse laterally relative to the target surface 70 without spraying until encountering another indicator 74. In some examples, indicator 74 can cause AMS 12 to apply fluid to certain portions of the target surface 52 and not others (such as above and below a window).

Indicators 74 can be formed by a tape applied at the boundaries of the non-spray areas 70. In some examples, indicator 74 can be applied at the lateral boundaries of the non-spray area, and instructions can be stored in memory 52 that cause control module 28 to control spraying by AMS 12 and movement of AMS 12 based on the indicator 74. For example, a first type of tape can be associated with windows and a second type of tape can be associated with doors. Control module 28 can cause AMS 12 to spray according to different routines based on the type of tape encountered.

During typical spray operations, various non-spray areas are taped to prevent the spray from adhering in those non-spray areas. Indicators 74 can be applied during the taping process such that AMS 12 can determine the presence of the non-spray area associated with indicator 74. AMS 12 includes an indicator sensor, which can be an optical sensor configured to identify indicator 74 based on the visual marker. In some examples, the indicator sensor can be disposed on mobile base 18. The visual marker can be of any desired configuration, such as a pattern or a color, among other options. Multiple ones of indicators 74 can include different visual markers and instructions associated with each different visual marker can be stored in memory 52. For example, a first visual marker can be associated with windows and a second visual marker can be associated with doorways. The control module 28 can determine that fluid needs to be applied above and/or below the non-spray area based on the indicator sensor sensing the first visual marker. The control module 28 can determine that AMS 12 should be driven laterally relative to target surface 70 without applying any additional spray fluid above and/or below the non-spray area based on the second visual maker. In some examples, indicator 74 can be formed from a material configured to be sensed by the indicator sensor. For example, indicator 74 can be a foil tape, such as a tape that includes a ferrous metal, and the indicator sensor can be a magnetic sensor configured to sense the metallic tape.

Figure 5:
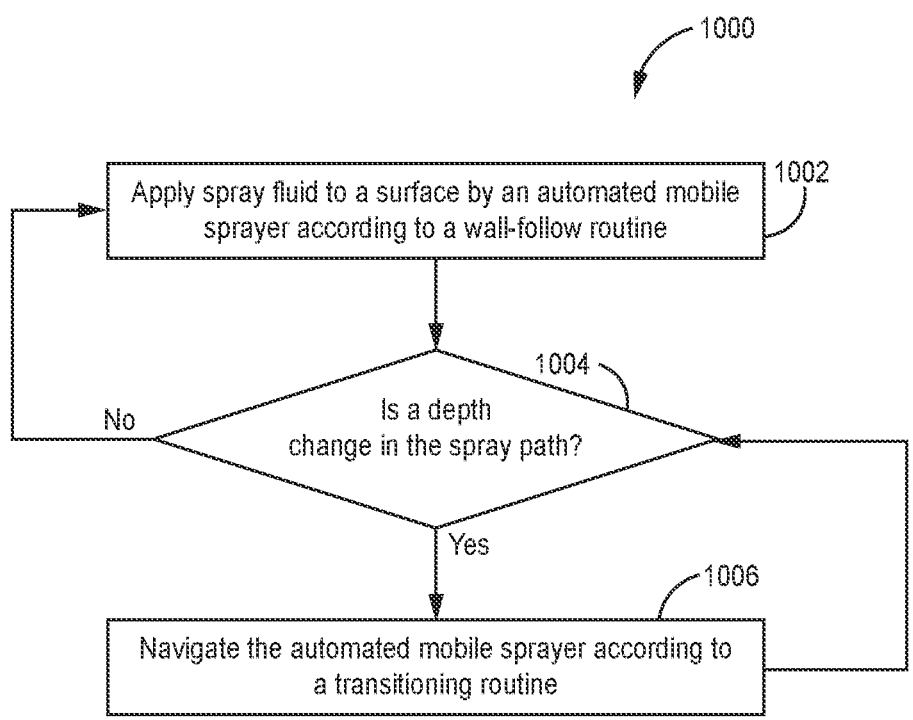
FIG. 5 is a flowchart illustrating a method.

FIG. 5 is a flowchart illustrating method 1000. Method 1000 is a method of navigating depth changes in a target surface. In step 1002, an automated mobile sprayer, such as AMS 12 (FIGS. 1A-1C), applies spray fluid to a target surface according to a wall-follow routine. During the wall-follow routine, a control module, such as control module 28 (FIGS. 1B and 1C), controls movement of the AMS relative to the target surface based on data received from distance sensors, such as distance sensors 48 (FIGS. 1B-1C). More particularly, the control module controls movement of the AMS relative to the target surface based on wall sensors, such as wall sensors 56 (FIG. 1C), oriented towards the target surface and configured to generate data regarding the distance between the wall sensor and the target surface. The control module receives the distance data from the wall sensors and guides the AMS laterally relative to the target surface, such as along axis Y-Y (FIGS. 1A and 1C). The control module controls the AMS to maintain a desired orientation of the AMS relative to the target surface and a desired distance between the AMS and the target surface. For example, the control module can maintain the AMS substantially parallel to the target surface during spraying. In step 1002 the AMS operates as a proximity wall follower.

In step 1004, the control module determines whether a depth change is present in the spray path of the AMS. For example, a lead one of the wall sensors can indicate a sudden increase in the distance to the target surface. Such a sudden increase indicates a depth change. If the distance data indicates a substantially constant distance, then there is no depth change, the answer at step 1004 is NO, and method 1000 proceeds back to step 1002 such that the AMS continues to apply the spray fluid according to the wall-follow routine. If the distance data indicates a depth change, then the answer is YES and method 1000 proceeds to step 1006.

In step 1006, the control module navigates the AMS according to a void-crossing routine. The control module causes the AMS to stop spraying at the depth change, which can limit fluid application only to target surface. During the void-crossing routine, the control module utilizes data from navigation sensors, such as navigation sensors 50 (FIG. 1B) to control movement of the AMS relative to the target surface. When the AMS crosses over the entrance threshold of the depth change, the target surface is no longer the same distance from the AMS. In some cases, such as where the depth change is a doorway, the depth may change to such a degree that any surface beyond the depth change is out of range of the distance sensors. In either case, the AMS does not follow the wall-follow routine when navigating across the depth change. Instead, the control module navigates based on the navigation data received from the navigation sensors.

The navigation data provides a heading for the AMS. For example, the navigation sensor can include a compass, such as a magnetometer, among other sensing elements. The control module can maintain the directional heading of the AMS based on the navigation data from the navigation sensors. Maintaining the heading of the AMS allows the AMS to proceed on proximately the same path that the AMS traveled during the wall-follow routine. The AMS moves on the same heading and traverses the gap formed by the depth change Guiding the AMS based on the navigational data allows the AMS to travel on the same substantially parallel heading as the target surface. As such, the AMS will be properly positioned relative to the target surface when the AMS passes out of the gap such that the target surface is again in the spray path.

When the AMS begins to pass out of the gap formed by the depth change, a leading one of the distance sensors will initially sense the target surface. The control module can thereby determine the exit threshold of the depth change based on the location where the distance sensor indicates that the distance to the surface has returned to the expected value. The control module can confirm the location of the exit threshold based on another one of the distance sensors reacquiring the target surface. With the exit threshold of the depth change located, the control module can position the AMS on the exit side of the threshold and apply spray fluid to the target surface. The AMS has thus successfully navigated across the gap formed by the depth change and is again positioned to spray on the target surface. Method 1000 proceeds back to step 1002 and the AMS applies spray fluid according to the wall-follow routine.

Method 1000 provides significant advantages. The AMS is able to navigate across voids in the target surface while maintaining the desired spacing and orientation relative to that surface. The distance sensors allow the AMS to maintain a desired spacing and orientation relative to the target surface. The navigation sensors allow the AMS to traverse a void in the target surface while maintaining a heading. Maintaining the heading maintains the desired orientation of the AMS relative to the target surface even where sensors of the AMS cannot detect the target surface. The AMS switches back to the wall-follow routine after passing over the void, such that the AMS is again disposed at the desired distance from and orientation relative to the target surface. The AMS thereby applies fluids to the target surface without spraying at anomalies undesired locations, such as voids, and while navigating across those anomalies. The AMS is not limited to following the orientation of the target surface but can instead traverse the anomalies based on different inputs. Method 100 thereby facilitates more efficient spraying by the AMS not applying fluid at the anomalies and by identifying and navigating across the anomalies.

Figure 6:
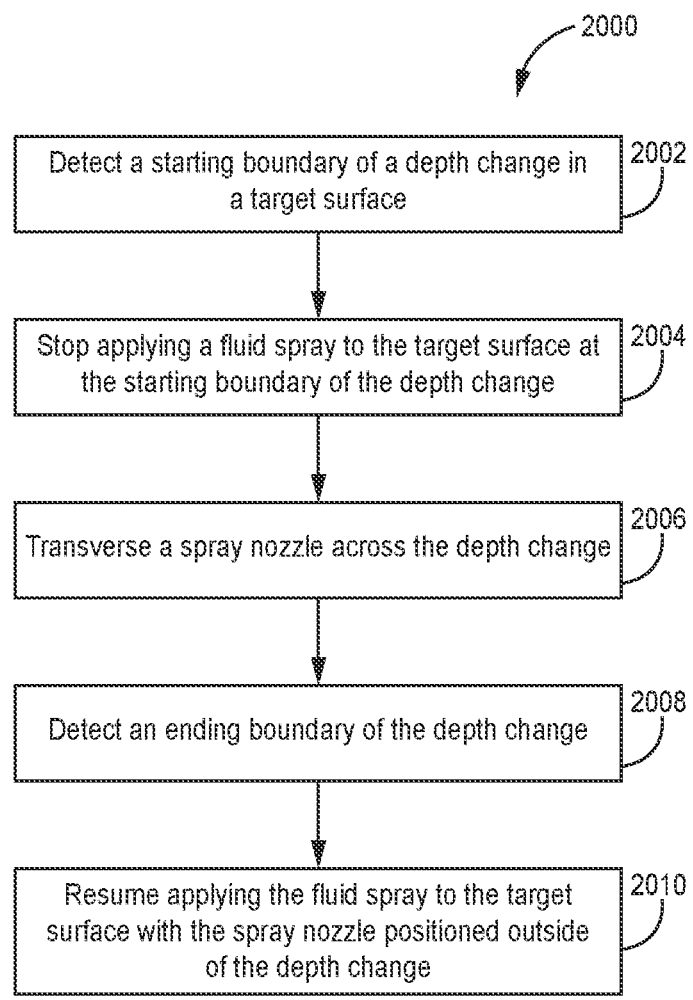
FIG. 6 is a flowchart illustrating a method.

FIG. 6 is a flowchart illustrating method 2000. Method 2000 is a method of spraying relative to depth changes in a target surface. Method 2000 can also be referred to as a spray modification routine.

In step 2002, an entrance threshold of a depth change is detected by an automated mobile sprayer, such as AMS 12 (FIGS. 1A-1C). For example, the control module, such as control module 28 (FIGS. 1B and 1C), of the AMS can detect the entrance threshold of the depth change based on distance data generated by distance sensors, such as distance sensors 48 (FIGS. 1B, 1C, and 2), of the AMS. The distance data can indicate a sudden increase in the distance to the target surface. In examples with multiple distance sensors, the lead distance sensor in the direction of movement initially indicates the sudden distance increase. The sudden increase indicates a depth change. For example, a depth change can be detected based on wall sensors, such as wall sensors 56 (FIG. 1C), mounted on the body of the AMS indicating a sudden increase in the distance to the target surface. In some examples, the depth change is detected based on path sensors, such as path sensors 62 (FIG. 2), mounted proximate the nozzle of the AMS and configured to move with the nozzle. In some examples, the control module can determine the type of depth change based on distance data from the wall sensors and the path sensors. The control module can classify the depth change as a transition, such as a doorway or a corner, where both the wall sensors and the path sensors sense a sudden increase in the distance to the target surface. In such an example, the control module can implement a wall transition routine to determine the type of transition. In examples where one, but not both, of the wall sensors and path sensors sense the depth change, the control module can classify the depth change as a discrete void in the target surface, such as a window. While the entrance threshold is described as detected based on distance data, it is understood that detection of the entrance threshold can be based on information input by the user. In some examples, the entrance threshold can be detected based on indicators 74, such as a foil tape or tape having a visual pattern.

In step 2004, the control module causes the AMS to stop spraying prior to the nozzle passing over the entrance threshold of the depth change. Stopping spraying prevents the AMS from applying fluid to the depth change, limiting fluid application to the target surface, which saves spray fluid and reduces wear on spray components. For example, the AMS can apply a vertical stripe on the target surface below a window opening and stop spraying when the nozzle reaches the entrance threshold of the window opening.

In step 2006, the nozzle is shifted relative to the target surface and across the depth change. For example, the nozzle can be shifted vertically or horizontally relative to the target surface. The control module can activate an applicator drive, such as applicator drive 34 (FIG. 1B), to cause the nozzle to shift vertically across the depth change. The control module can activate wheel drives, such as wheel drives 32 (FIG. 1C), to cause the AMS to shift laterally relative to the depth change.

During horizontal movement, the control module utilizes navigation data from navigation sensors, such as navigation sensors 50 (FIG. 1B), to drive the AMS horizontally across the depth change. The control module maintains the heading of the AMS based on the navigation data from the navigation sensors. The AMS thereby travels on the same path during the void-crossing routine as when the AMS is operating according to the wall-follow routine.

In step 2008, an exit threshold of the depth change is detected. The control module detects the exit threshold based on the distance data from the distance sensors, based on information provided by the user, and/or based on indicator 74. For example, the lead distance sensor in the direction of travel can indicate a sudden decrease in the distance to the target surface. The location of the sudden decrease provides the location of the exit threshold for the depth change. The AMS can continue to shift in the same direction relative to the target surface and depth change until one or more additional distance sensors locate the exit threshold. The control module can confirm the location of the exit threshold based on the additional data from the additional distance sensors.

In step 2010, the AMS resumes spraying after the nozzle passes over the exit threshold and out from over the depth change. The control module can cause the AMS to apply one or more fluid swaths to the target surface while spraying relative to a void. The control module can cause the AMS to operate according to the wall-follow routine after the AMS has passed over the depth change.

Method 2000 provides significant advantages. The AMS sprays or does not spray based on the location of a depth change. The user can manipulate any depth changes that are located on the target surface to control spraying by the AMS. For example, the user can tape a covering over the void flush with the target surface to cause the AMS to continue spraying over the void. The user can tape the covering such that the covering is recessed into the void to cause AMS to pass over the void without spraying. The spray modification routine saves material costs, prevents application of the spray fluid at undesired locations, and increases the efficiency of the application process.

Figure 7:
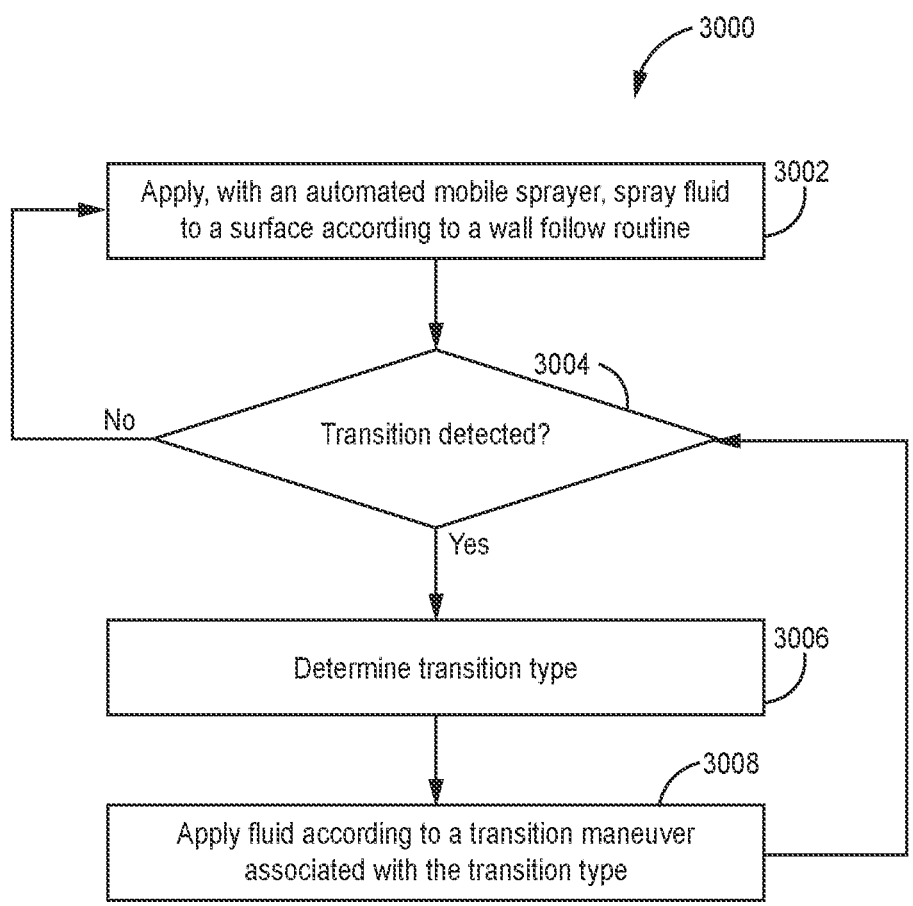
FIG. 7 is a flowchart illustrating a method

FIG. 7 is a flowchart illustrating method 3000. Method 3000 is a method of navigating and applying fluid at transition points. In step 3002, an automated mobile sprayer, such as AMS 12 (FIGS. 1A-1C), applies spray fluid to a target surface according to a wall-follow routine. During the wall-follow routine, a control module, such as control module 28 (FIGS. 1B and 1C), controls movement of the AMS relative to the target surface based on data received from distance sensors, such as distance sensors 48 (FIGS. 1B, 1C, and 2). More particularly, the control module controls movement of the AMS relative to the target surface to maintain a spacing between the AMS and the target surface and an orientation of the AMS relative to the target surface. For example, the control module can control movement of the AMS based on data from sensors oriented towards the target surface and configured to generate data regarding the distance between the sensor and the target surface, such as based on data from wall sensors 56 (FIG. 1C). The control module receives the distance data from the wall sensors and guides the AMS laterally relative to the target surface, such as along axis Y-Y (FIGS. 1A and 1C). For example, the control module can maintain the AMS substantially parallel to the target surface during spraying. In step 3002 the AMS can operate as a proximity wall follower.

In step 3004, a transition is detected. The control module receives distance data from distance sensors of the AMS and locates a transition based on the distance data. The transition can be an inside transition or an outside transition. The control module can further determine a transition point, which is a point at which the control module initiates the transition maneuver. The transition point can be disposed at the transition or spaced from the transition. For example, an inside transition can be identified based on distance data from distance sensors, such as front sensors 58 (FIG. 1C) and/or corner sensors 60 (FIG. 1C), indicating a decreasing distance to an object as AMS proceeds through the wall-follow routine. The transition point can be spaced from the transition by a sufficient distance to allow the AMS to perform the transition maneuver, which can include pivoting. An outside transition can be identified based on distance data from distance sensors, such as corner sensors 60 and/or wall sensors 56, indicating a sudden increase in distance. The sudden increase occurs at the transition and indicates an outside transition. The control module identifies the presence of a transition and determines the location of the transition point relative to the transition based on the transition type.

If the answer in step 3004 is NO, then method 3000 proceeds back to step 3002 and the AMS continues to apply fluid according to the wall-follow routine. If the answer to step 3004 is YES, then method proceeds to step 3006. In step 3006, the type of transition is determined. For example, the control module can receive distance data from the various distance sensors and determine the transition type based on that distance data.

The control module can differentiate between various transition types and initiate a transition maneuver based on the identified transition type. For example, the control module can differentiate between various inside transitions based on distance data from one or both of the front sensors and the corner sensors. An inside transition can be classified as an inside square transition where multiple ones of the front sensors indicate the same distance to the transition wall as the AMS approaches the transition wall. Each front sensor indicating the same distance to the transition wall indicates that the transition is a square transition, which includes approximately a 90-degree intersection between surfaces. The control module can classify the inside transition as an angled transition, which is a transition having an angle between 90-degrees and 180-degrees between the surfaces, such as transition T4 (FIG. 3), based on distance data from front sensors and corner sensors.

In examples where an outside transition is detected, the control module can differentiate between various outside transitions based on distance data from one or both of the wall sensors and corner sensors. For example, an outside transition can initially be detected based on distance data generated by the corner sensors indicating a sudden increase in distance. The outside transition can be classified as one of an outside square transition and an outside angled transition based on the distance data generated before and/or during the transition maneuver.

In step 3008, the AMS applies spray fluid at the transition according to a transition maneuver associated with the transition type determined in step 3006. For example, the control module can recall a transition maneuver from a memory, such as memory 52 (FIGS. 1B-1C), based on the transition type identified in step 3006. In some examples, a maneuver library can be stored in the memory and the control module can recall the transition maneuver from the library based on the determined transition type. The control module implements the transition maneuver to cause the AMS to apply fluid at the transition and navigate the transition. As such, the transition maneuver can include both drive commands, controlling movement of the AMS, and spray commands, controlling spraying by the AMS. After executing the transition maneuver, method 3000 proceeds back to step 3004 to determine if another transition point is encountered. The AMS may not be able to detect the true nature of the transition at the beginning of the transition maneuver. As such, the transition type may update as the AMS shifts according to the transition maneuver. For example, the AMS may not be able to detect that an outside corner is actually an outside stub wall, similar to outside stub transition T3 (FIG. 3), until the AMS begins executing a transition maneuver based on the transition type being an outside corner. If another transition is detected, method 3000 proceeds to step 3006 and the control module determines the updated transition type, such as that the outside corner is actually an outside stub wall, as AMS is executing the initial maneuver. Method 3000 then proceeds to step 3008 and the control module implements the additional steps associated with a maneuver for the updated transition type and completes the transition. If another transition is detected at step 3004, then method 3000 proceeds through steps 3006 and 3008 to navigate through the transition and apply fluid to the transition. If another transition is not detected at step 3004, then method 3000 proceeds back to step 3002. At step 3002, the control module can align the AMS on the transition surface and causes the AMS to apply fluid to the transition surface according to the wall-follow routine.

Method 3000 provides significant advantages. The AMS detects transitions and determines the transition types based on distance data generated by distance sensors. The memory stores various transition routines and the control module can recall the transition maneuver needed based on the transition type identified. As such, the AMS can autonomously identify and differentiate between various transition types. The AMS further autonomously navigates through and applies fluid at the transitions. The AMS autonomously identifying, navigating, and spraying the transitions provides an efficient spray process that does not require user intervention. The user is thereby freed to complete other tasks, further increasing operational efficiency.

Figure 8:
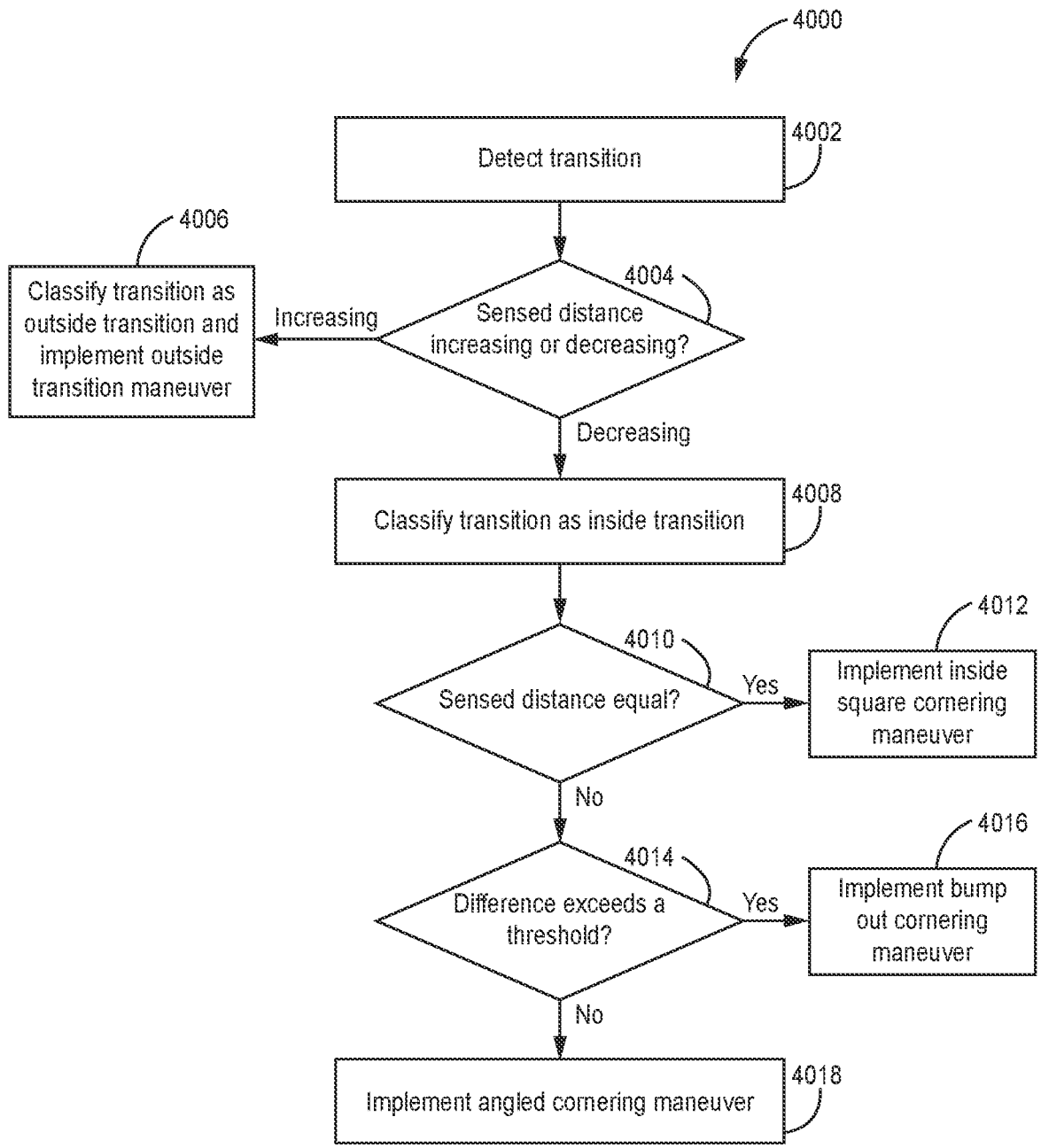
FIG. 8 is a flowchart illustrating a method.

FIG. 8 is a flowchart illustrating method 4000. Method 4000 is a method of determining a transition type. In step 4002, a transition is detected. For example, distance data generated by distance sensors, such as distance sensors 48 (FIGS. 1B-1C, 2), can indicate the presence of a transition being approached by the automated mobile sprayer (AMS), such as AMS 12 (FIGS. 1A-1C). The transition is detected and monitored to determine the transition type. A control module of the AMS, such as control module 28 (FIGS. 1B-1C), controls movement of the AMS and spraying by the AMS relative to the transition based on the transition type.

In step 4004, the control module of the AMS analyzes distance data from distance sensors of the AMS to determine the transition type. The transition can be classified as one of an outside transition and an inside transition based on whether the distance data indicates an increased distance or a decreased distance. The distance data can be generated by one or more of wall sensors 56 (FIG. 1C), front sensors 58 (FIG. 1C), and corner sensors 60 (FIG. 1C).

If the distance data indicates increasing distance or a sudden increase in distance, then method 200 proceeds to step 206. In step 206, the transition is classified as an outside transition. The control module recalls an outside transition maneuver and executes the outside transition maneuver to cause the AMS to navigate the outside transition and apply fluid relative to the outside transition. As discussed further herein, the control module can distinguish between various types of outside transitions during the outside transition maneuver and can dynamically control movement and spraying by the AMS during the outside transition maneuver to compensate for a varying transition type. For example, the control module can initially determine the presence of the outside transition based on the distance data from corner sensors. The control module can cause the AMS to drive forward at the transition until a leading one of the wall sensors, such as wall sensor 56a(FIG. 1C), indicates an increased distance. The control module can classify the outside transition as an outside angled transition or an outside square transition based on the distance increase indicated by the wall sensors and/or corner sensors. For example, a gradual increase in distance can indicate an outside angled transition whereas a sudden increase in distance can indicate an outside square transition. For example, the distance increase can be classified as sudden where the magnitude of the increase is greater than a threshold value.

If the distance data indicates a decreasing distance, then the transition is classified as an inside transition at step 4008 and method proceeds to step 4010.

In step 4010, distance data from multiple ones of distance sensors, such as from multiple ones of front sensors 58 is compared. The control module determines if each front sensor indicates the same distance to the transition feature. If the answer in step 4010 is YES, then the transition is classified as an inside square corner and method 4000 proceeds to step 4012. In step 4012, the control module implements an inside square cornering routine at the transition point. For example, the control module can recall the inside square cornering routine from a memory, such as memory 52 (FIGS. 1B and 1C) and implement the inside square cornering routine.

If the answer in step 4010 is NO, then method 4000 proceeds to step 4014. In step 4014, the control module determines whether the inside transition is a bump out, similar to transition T4 (FIG. 3) or an angled corner, similar to transition T5 (FIG. 4). The control module compares the distances indicated by various ones of the distance sensors to determine the transition type. For example, the control module can compare the distance indicated by an outer front sensor, such as front sensor 58*a*(FIG. 1C), with the distance indicated by an inner front sensor, such as front sensor 58*b* (FIG. 1C). The outer front sensor is the front sensor further from the target surface when compared to the inner front sensor, and the inner front sensor is the front sensor closer to the target surface when compared to the outer front sensor. In some examples, the outer front sensor is the front sensor furthest from the target surface while the inner front sensor is the front sensor closest to the target surface. The control module determines if the distance indicated by the outer front sensor exceeds the distance indicated by the inner front sensor by a threshold value. The threshold can be set at any desired level suitable for differentiating between an angled transition and a bump out transition. In some examples, the control module further analyzes distance data from the corner sensors to determine whether the transition is a bump out or angled transition. If the answer in step 4014 is YES, then the control module can classify the transition as a bump out and method proceeds to step 4016. In step 4016, the control module implements a bump out transition maneuver routine and controls movement of the AMS and spraying by the AMS according to the routine. For example, the control module can recall the bump out transition routine from the memory. The bump out transition can include an inside cornering maneuver and an outside cornering maneuver. If the answer in step 4014 is NO, then the control module can classify the transition as an angled inside corner and method proceeds to step 4018. In step 4018, the control module implements an inside angled transition maneuver routine and controls movement of the AMS and spraying by the AMS according to the routine. For example, the control module can recall the inside angled transition routine from the memory.

Method 4000 provides significant advantages. The AMS can differentiate between various types of transitions based on the distance data and implements the appropriate transition maneuver based on the identified transition type. The AMS applies spray fluid and navigates through the transition based on the identified transition type. Spraying and navigating based on the transition type allows the AMS to efficiently navigate the transition while reducing material costs by applying the required amount of fluid for that transition. In addition, distinguishing between transition types allows the AMS to efficiently navigate the full spray site without user intervention, thereby freeing the user to complete other tasks. The AMS identifying the transition type and implementing the appropriate transition routine increases the efficiency of the spray operation, reduces the need for user input, ensures appropriate spray coverage at the transition, and allows the AMS to autonomously navigate the spray site.

Figure 9:
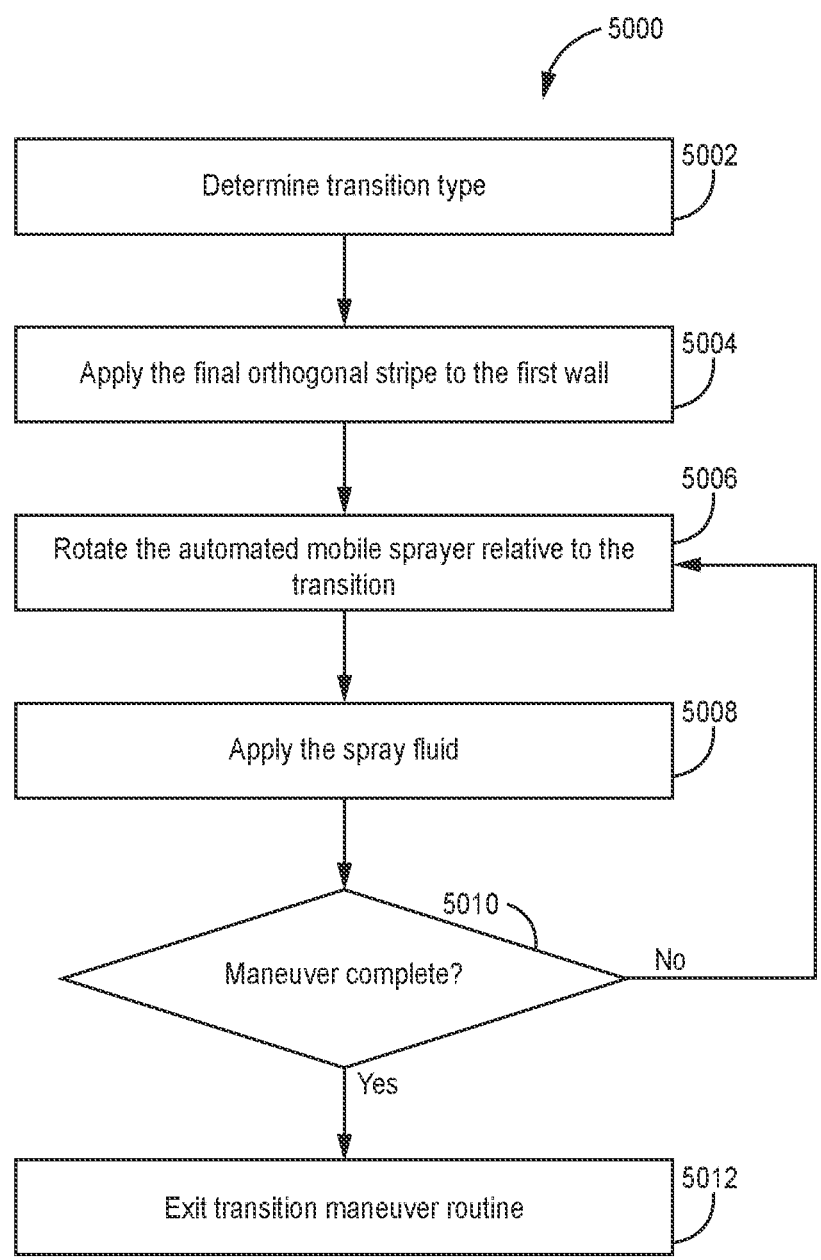
FIG. 9 is a flowchart illustrating a method.

FIG. 9 is a flowchart illustrating method 5000 of performing a transition maneuver. During a transition maneuver, an automated mobile sprayer (AMS), such as AMS 12 (FIGS. 1B, 1C, 2), moves relative a transition and applies fluid to the surfaces forming the transition. In step 5002, the transition type, such as whether the transition is an outside transition or an inside transition, is determined. In some examples, the specific type of inside or outside transition, such as an angled or square corner, is determined at step 5002. For example, a control module, such as control module 28 (FIGS. 1B-1C), can determine the transition type based on distance data generated by distance sensors, such as distance sensors 48 (FIGS. 1B-1C). The control module can monitor the transition as the AMS approaches the transition to determine the transition type.

In step 5004, the AMS applies the final orthogonal stripe to the target surface. The final orthogonal stripe can be applied at the transition point, such as at the edge of the target surface where the target surface meets the transition surface to form the transition for an outside transition or at a point spaced from the transition surface for an inside transition. The location of the transition point can be spaced from the actual transition location by a suitable distance that allows room for the AMS to pivot from being aligned on the target surface to being aligned on the transition surface. It is understood that various transition points can be spaced from the transition surface by different distances depending on the type of pivot utilized. For example, the AMS can pivot on a wheel, such as any one of wheels 30 (FIGS. 1A-1C), such that the wheel is fixed in a location as AMS pivots. In other examples, the AMS can pivot such that a point associated with the base, such as base 18 (FIGS. 1A-1C), of the AMS remains fixed. The AMS can perform any desired type of pivot.

In step 5006, the control module causes the AMS to rotate relative to the transition. For example, the control module can activate wheel drives 32 (FIG. 1C) to rotate one or more of the wheels of the AMS and cause the AMS to pivot. For example, the AMS can rotate away from the transition for an inside transition and towards the transition for an outside transition. The degree of rotation can be set at any desired level and can be based on the type of transition. For example, the control module can cause the AMS to rotate about 22.5-degrees, 30-degrees, 45-degrees, 60-degrees, or any other desired degree of rotation based on the transition type.

The control module receives orientation data from navigation sensors, such as navigation sensors 50 (FIG. 1B-1C), as the AMS rotates. The orientation data allows the control module to determine the degree of rotation of the AMS. Movement of the AMS can be controlled based on the orientation data. The control module can further control pivoting of the AMS based on distance data generated by the distance sensors. The control module can determine that the AMS is properly oriented relative to the transition and the surfaces after and/or during rotation based on distance data from distance sensors and/or navigation data from the navigation sensors. The control module can reorient the AMS to a desired position prior to commencing the pivot maneuver. For example, the distance data can indicate that the AMS is too close to the transition to complete the desired routine. In such an example, the control module can cause the AMS to drive in reverse to provide the desired spacing prior to rotating the AMS.

In step 5008, the control module causes the AMS to apply fluid to the transition. For example, the control module can activate the drive associated with the spray module, such as applicator drive 34 (FIG. 1B) associated with spray module 16 (FIGS. 1A-1C), to displace the spray module vertically along axis Z-Z (FIGS. 1A-1B) of the AMS. The control module can further cause a spray valve, such as control valve 46 (FIG. 1B), to shift open to allow the spray fluid to flow to and out of the spray nozzle of the spray module.

In step 5010, the control module determines whether the transition maneuver is complete. Various transition maneuvers can include different numbers of rotating and fluid application steps. For example, an inside square cornering routine can include three rotations of about 30-degrees, while an inside 45-degree cornering routine can include a single rotation of about 45-degrees or two rotations of about 22.5-degrees. The control module can determine if the transition maneuver is complete based on the transition maneuver routine being utilized.

In some examples, the control module can determine if the transition maneuver is complete based on data from distance sensors and/or navigation sensors. For example, the control module can determine that the transition maneuver is complete based on the wall sensors, such as wall sensors 56 (FIG. 1C), indicating that the AMS is aligned with the transition surface. The control module can also determine that the transition maneuver is complete based on the orientation data indicating that the AMS has rotated the required degree to be oriented on the transition wall. If the answer in step 5010 is NO, then method 5000 proceeds back to step 5004 and the AMS continues to proceed through the transition maneuver. If the answer in step 5008 is YES, then method 5000 proceeds to step 5010.

In step 5010, the AMS has completed the transition maneuver. The control module exits the transition maneuver routine. In some examples, the control module can cause the AMS to stop spraying after exiting the transition maneuver routine. For example, the control module can determine that the AMS has completed the spray job. The control module can determine that the spray job is complete based on navigation data and/or information from the user. For example, the navigation data can indicate that the AMS has reached the starting point of the spray job. In some examples, the AMS can alert the user, such as via user interface 36 (FIGS. 1A-1C), when the spray job is complete. In other examples, the control module can cause the AMS to continue spraying. For example, the control module can align the AMS on the transition wall and implement the wall-follow routine to cause the AMS to apply fluid to the transition wall.

Method 5000 provides significant advantages. Controlling movement of the AMS and spraying by the AMS according to method 5000 facilitates the AMS navigating various type of inside transitions. The AMS can apply the fluid and navigate through the transition regardless of the nature of the transition (e.g., whether the transition is an inside angled transition, an inside square transition, or a bump out, among other options). As such, the AMS can autonomously navigate and apply fluid relative to various inside transitions. The AMS identifying the transition type and implementing the appropriate transition routine increases the efficiency of the spray operation, reduces the need for user input, ensures appropriate spray coverage at the transition, and allows the AMS to autonomously navigate the spray site.

Figure 10:
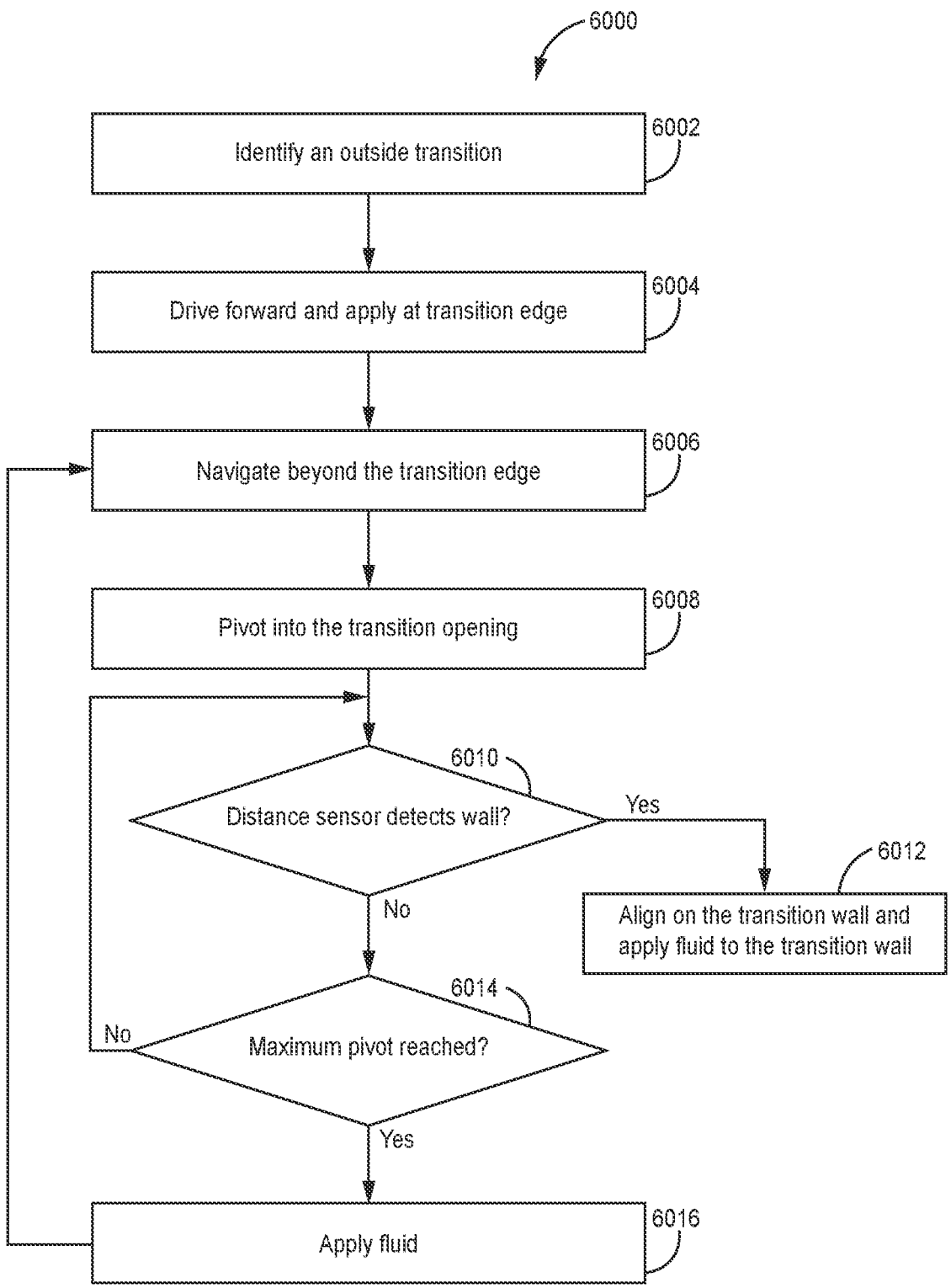
FIG. 10 is a flowchart illustrating a method.

FIG. 10 is a flowchart illustrating method 6000. Method 6000 is a method of maneuvering an automated mobile sprayer (AMS), such as AMS 12 (FIGS. 1A-1C), relative an outside transition. In step 6002, the transition is identified as an outside transition. For example, the transition can be identified as an outside transition based on distance data from distance sensors, such as distance sensors 48 (FIGS. 1B-1C). For example, corner sensors, such as corner sensors 60 (FIG. 1C), or wall sensors, such as wall sensors 56 (FIG. 1C), can indicate a sudden increase in distance. Such a distance increase can indicate an opening where an outside transition occurs.

In step 6004, the AMS drives forward to an edge of the transition and applies fluid at the transition edge. For example, a leading one of the wall sensors, such as wall sensor 56a(FIG. 1C), of the AMS indicates a sudden increase in distance when the wall sensor passes the transition edge. The spacing between the wall sensors and the spray nozzle of the AMS is known. The control module, such as control module 28 (FIGS. 1B-1C), of the AMS can determine the distance that AMS needs to shift to apply a fluid stripe at the transition edge based on the spacing between the lead wall sensor and the spray nozzle and the location where the lead wall sensor passes the transition edge. In some examples, the control module can determine the distance that AMS needs to shift based on the width of the spray fan emitted by the nozzle. The AMS then applies a fluid stripe at the transition edge. For example, the AMS can apply the spray fan so an edge of the spray fan is at the transition edge, a center of the spray fan is at the transition edge, or to have any other desired relative orientation between the spray fan and the transition edge.

In step 6006, the AMS drives forward beyond the transition edge. For example, the AMS can drive forward until a trailing one of the wall sensors, such as wall sensor 56b (FIG. 1C), of the AMS indicates a sudden increase in distance, indicating that that wall sensor has passed the transition edge. In some examples, the AMS continues to drive for a set distance beyond the location where the trailing one of the wall sensors passes the transition edge. The additional distance is configured to provide the AMS sufficient room to pivot about the transition. As such, the additional distance can vary depending on the dimensions of the AMS and the locations of the wall sensors on the AMS. In some examples, the control module can cause the AMS to drive a set distance beyond the transition edge based on the known spacing between the lead sensor that detected the transition location and the trailing end of the AMS.

The control module can control movement of the AMS beyond the transition edge based on orientation data generated by one or more navigation sensors, such as navigation sensor 50 (FIGS. 1B-1C). In step 6008, the AMS pivots into the transition opening towards the transition surface.

In step 6010, the control module determines whether the transition wall is detected by distance sensors of the AMS. The control module can determine whether the transition wall is detected as the AMS is pivoting into the transition. For example, the control module can determine whether the distance data from the leading one of the wall sensors indicates a plausible distance to the transition surface. The plausibility of the distance is based on the expected spacing between the AMS and the transition surface given the known location of the transition edge and the travel distance of the AMS from the transition edge. For example, the wall sensor may indicate an implausibly large distance where the outside transition is an outside stub wall. In some examples, the determination made in step 6010 can be based on the distance data generated by a single one of wall sensors, such as the leading one of the wall sensors. The trailing one of the wall sensors may not be aligned with the transition surface due to the pivoting by the AMS even though the AMS is properly positioned relative to the transition wall.

If the answer in step 6010 is YES, then method 6000 proceeds to step 6012. In step 6012, the AMS aligns on the transition wall and applies fluid to the transition wall. In some examples, the AMS can drive forward a set distance to position the nozzle for spraying. In some examples, the AMS can drive forward until the trailing one of the wall sensors also senses the transition wall. The AMS thereby detects the transition edge and can, in some examples, drive in reverse to align the nozzle on the transition edge and apply a stripe on the transition surface at the transition edge. The control module can align the AMS on the transition surface based on the distance data generated by the wall sensors. With the AMS aligned on the transition surface, the outside cornering routine is complete and the AMS can apply fluid to the transition wall based on the wall-follow routine.

If the answer in step 6010 is NO, then method 6000 proceeds to step 6014. In step 6014, it is determined whether the AMS has reached a maximum pivot. The control module controls pivoting of the AMS based on the orientation data from the navigation sensor. The control module determines the degree of rotation based on the orientation data. For example, the navigation sensor can include an inertial measurement unit, among other options. The control module is configured to pivot AMS up to a maximum degree of rotation. The maximum degree of rotation can be set at any desired level, such as about 90-degrees, about 115-degrees, or any other desired degree of rotation. The maximum degree of rotation is set at a level such that AMS has sufficiently pivoted about the transition while preventing the AMS from over-rotating and contacting the transition wall.

The AMS continues to pivot into the transition until the answer in one of steps 6010 and 6014 is YES. As such, if the answer in step 6014 is NO, then the AMS continues to pivot until one of steps 6010 and 6014 is true. If the answer in step 6014 is YES, then the transition can be classified as an outside stub wall, similar to transition T3 (FIG. 3), and method 6000 proceeds to step 6016. In step 6016, the AMS aligns on the transition wall and applies a fluid stripe. In examples where the maximum pivot is greater than 90-degrees, the control module can cause the AMS to pivot back such that the total rotation is about 90-degrees. The control module then causes the AMS to apply fluid to the stub end. In some examples, the control module can confirm the width of the stub end by driving AMS relative to the stub end such that the wall sensors locate the boundary edges of the stub end. The control module can then position the AMS relative to the stub end and cause the AMS to apply fluid to the stub end via one or more swaths of spray fluid. After the AMS applies fluid to the stub end, method 6000 proceeds back to step 6006 and performs another outside cornering maneuver to navigate about the outside transition forming the second side of the outside stub.

Method 6000 provides significant advantages. Controlling movement of the AMS and spraying by the AMS according to method 6000 facilitates the AMS navigating various type of outside transitions, even in instances where the particular outside transition cannot be identified prior to beginning the maneuver. The AMS can begin the outside maneuver and is able to apply the fluid and navigate through the transition regardless of the nature of the transition (e.g., whether the transition is an outside angled transition, an outside square transition, or an outside stub, among other options). As such, the AMS can autonomously navigate relative to various outside transitions. The AMS identifying the transition type and implementing the appropriate transition routine increases the efficiency of the spray operation, reduces the need for user input, ensures appropriate spray coverage at the transition, and allows the AMS to autonomously navigate the spray site.

Figure 11:
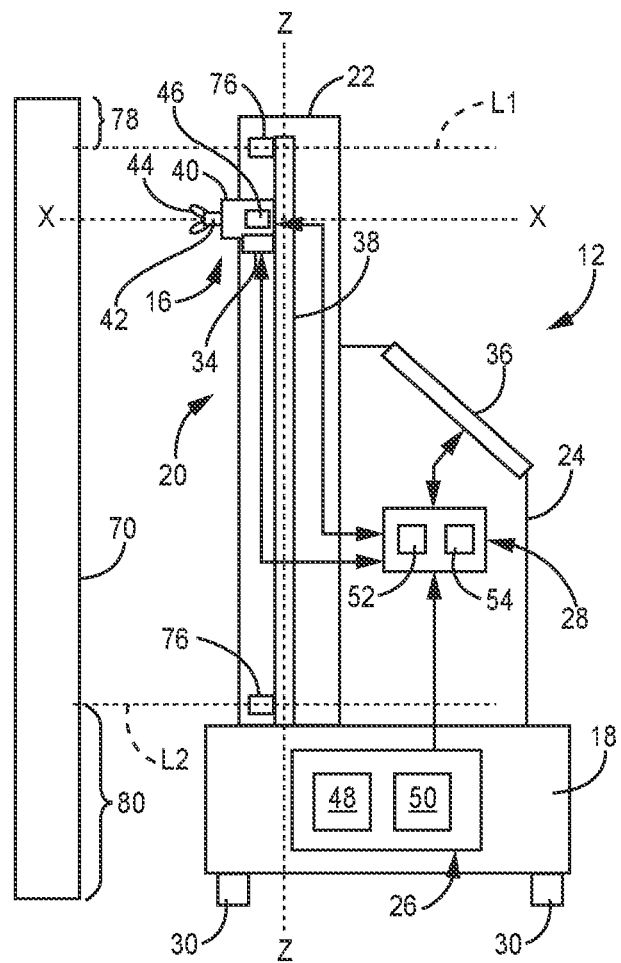
FIG. 11 is a schematic side elevation view of an automated mobile sprayer.

FIG. 11 is a schematic side elevation view of AMS 12 further including actuator 76. Actuator 76 is configured to cause nozzle 44 to tilt relative to target surface 70 during spraying.

Figure 12:
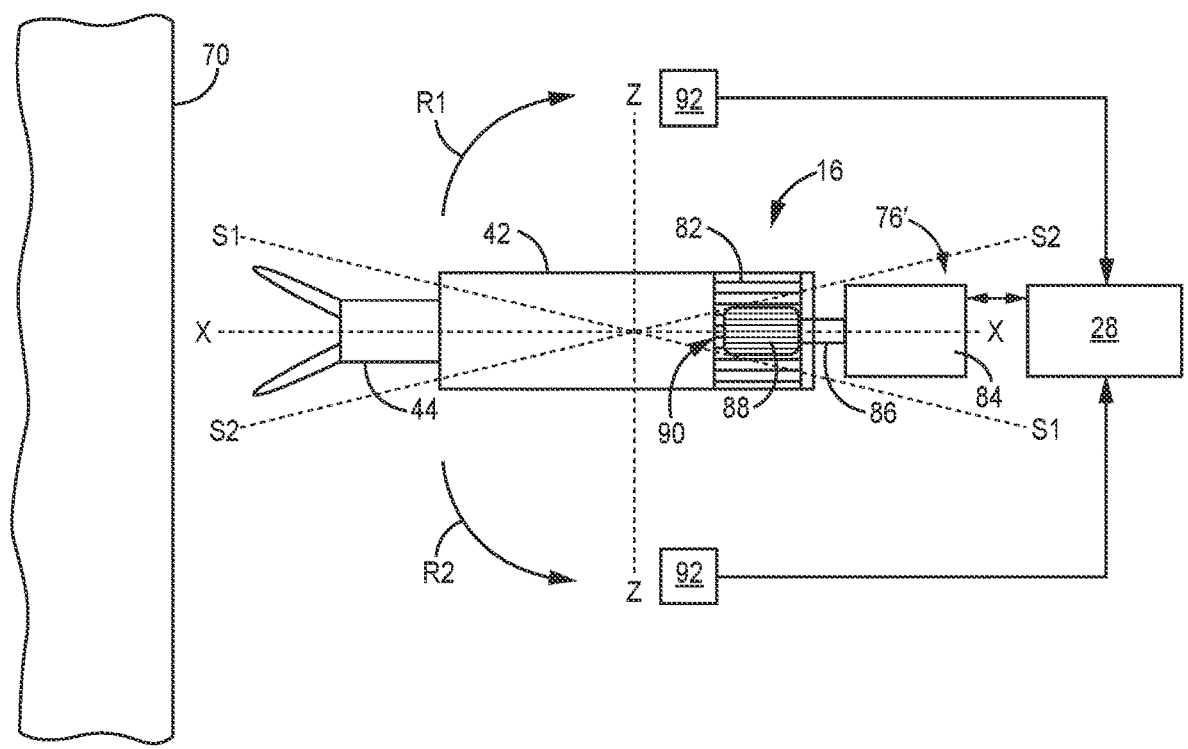
FIG. 12 is a schematic diagram of a spray module and an actuator.

Actuator 76 is operatively associated with spray module 16 to alter a spray angle of nozzle 44 during operation. Actuator 76 can be configured to actuate spray module 16 mechanically, electrically, pneumatically, hydraulically, magnetically, or in any other manner suitable for actively actuating spray module 16 to alter the spray angle. Nozzle 44 is normally oriented orthogonal to surface 70 during spraying. Support 20 limits the distance that nozzle 44 can translate vertically along axis Z-Z. Spray module 16 can translate upwards along support 20 only to upper limit L1, due to an enclosed top of support enclosure 22, for example. In enclosed environments, such as when spraying indoor walls, upper limit L1 prevents nozzle 44 from applying the spray fluid to upper portion 78 of surface 70, disposed above upper limit L1. Spray module 16 can translate downwards only to lower limit L2, due to base 18, for example. Lower limit L2 prevents nozzle 44 from applying the spray fluid to lower portion 80 of surface 70 disposed below lower limit L2. Actuator 76 is operably associated with spray module 16 to tilt nozzle 44 upward or downward. In some examples, actuator 76 mechanically interfaces with spray body 42 to pivot spray body 42 relative to module housing 40. In some examples, spray body 42 pivots on an axis substantially parallel to axis Y-Y. Tilting nozzle 44 upward increases the angle of nozzle 44 relative to surface 70, pivoting nozzle 44 in direction R1 (FIG. 12) such that nozzle 44 is oriented to spray along axis S1-S1 (FIG. 12). Axis S1-S1 is non-orthogonal to the Y-Z plane. As spray body 42 tilts from being aligned on axis X-X to being aligned on axis S1-S1, nozzle 44 can sweep the fluid spray over the upper portion 78 of surface 70 disposed above upper limit L1, thereby applying fluid to the upper portion 78 of surface 70. Tilting nozzle 44 downward decreases the angle of nozzle 44 relative to surface 70, pivoting nozzle 44 in direction R2 (FIG. 12) such that nozzle 44 is oriented to spray along axis S2-S2 (FIG. 12). Axis S2-S2 is non-orthogonal to the Y-Z plane. As spray body 42 tilts from being aligned on axis X-X to being aligned on axis S2-S2, nozzle 44 can sweep the fluid spray over the lower portion 80 of surface 70 disposed below lower limit L2, thereby applying fluid to the lower portion 80 of surface 70.

In some examples, actuator 76 is configured to continuously or nearly continuously alter the orientation of nozzle 44 as spray module 16 moves vertically up and down. For example, actuator 76 can be configured to manipulate the orientation of nozzle 44 such that nozzle 44 is oriented orthogonal to surface 70 when spray module 16 is at the midpoint between the upper limit L1 and the lower limit L2, the actuator 76 can then tilt nozzle 44 upward as spray module 16 moves upward and can tilt nozzle 44 downward as spray module 16 moves downward. Continuously altering the orientation of nozzle 44 provides a smooth, steady speed transition for nozzle 44. The smooth transition provides a smooth spray finish on target surface 70 and provides even coverage between upper limit L1 and lower limit L2, above upper limit L1, and below lower limit L2. In some examples, control module 28 is configured to implement variable speed control for nozzle 44 during the continuous tilt. For example, control module 28 can vary the speed of the tilt throughout the vertical travel and/or vary the speed of vertical travel. In some examples, the speed of vertical travel is adjustable prior to operation and remains constant during spraying. For example, the speed of vertical travel can be based on a desired flow rate, the amount of material to be sprayed on the surface, etc.

The speed of the angular rotation of nozzle 44 can be varied to provide a consistent coating on the target surface.

The speed of angular rotation can be varied while the speed of vertical movement can be fixed. The rate of the angular rotation can be varied such that the rate is slower at the ends of vertical travel and faster at locations intermediate the vertical travel limits. For example, the rate of angular rotation can accelerate as nozzle 44 moves from the upper travel limit to the midpoint of travel and can decelerate as nozzle 44 moves from the midpoint of travel to the lower travel limit. During upward movement, the rate of angular rotation can accelerate as nozzle 44 moves from the lower travel limit to the midpoint of travel and can decelerate as nozzle 44 moves from the midpoint of travel to the upper travel limit. In some examples, the rate of angular rotation varies based on the section of the vertical travel extent that nozzle 44 is within. For example, the vertical travel can be divided into three or more sections and the rate of angular rotation can be set to vary across the three or more sections. In one example, the first section can be between the upper travel limit and the beginning of the second section, the second section can be between the first and third sections, and the third section can be between the second section and the lower travel limit. The rate of angular rotation can be slower in the first and third sections relative to the second section. In one example, the rate of angular rotation is the same in the first and third sections. The rate of angular rotation can be fixed within each section while being variable for the full extent of vertical travel. In some examples, the nozzle 44 can continuously pivot relative to wall but does not have a constant speed of rotation during vertical travel.

The sections can be sized in any desired manner. For example, the first section can be between about 5%-20% of the full vertical travel distance, the second section can be between about 60%-90% of the vertical travel distance, and the third section can be between about 5-20% of the vertical travel distance. In some examples, the first section can be between about 10%-15% of the full vertical travel distance, the second section can be between about 70%-80% of the vertical travel distance, and the third section can be between about 10-15% of the vertical travel distance. In some examples, the first section is sized the same as the third section.

Actuator 76 can be of any desired configuration suitable for tilting nozzle 44 to provide a non-orthogonal spray. For example, actuator 76 can be a mechanical actuator, an electric actuator, a pneumatic actuator, a hydraulic actuator, or any combination thereof, among other options. In some examples, actuator 76 physically contacts and drives spray body 42 to tilt nozzle 44 upward or downward. For example, actuator 76 can include projections disposed proximate upper limit L1 and lower limit L2 that mechanically contact spray body 42 and pivot spray body 42 as spray module 16 reaches upper limit L1 and lower limit L2.

In another example, actuator 76 can be electrically powered. For example, actuator 76 can be a servo motor operatively connected to spray module 16, among other options. Actuator 76 is powered and drives spray body 42, such as by a geared interface, to tilt nozzle 44 as spray module 16 moves between and/or reaches upper limit L1 and lower limit L2. Actuator 76 can be communicatively coupled to control module 28, which can, in some examples, control the tilting of spray body 42 via actuator 76. In examples where actuator 76 is an electric actuator, actuator 76 can be mounted to spray module 16 to travel with spray module 16. The motor of actuator 76 can actuate nozzle 44 proximate the upper limit L1 and lower limit L2 and/or continuously alter the orientation of nozzle 44 between upper limit L1 and lower limit L2. In some examples, control module 28 can command actuator 76 to adjust nozzle 44 to a desired orientation relative surface 70 and cause actuator 76 to maintain nozzle 44 at the desired orientation throughout spraying.

During operation, actuator 76 causes nozzle 44 to tilt upward and apply spray fluid to upper portion 78. Nozzle 44 continues to spray as nozzle 44 tilts upwards. Nozzle 44 thereby sweeps the fluid spray over upper portion 78 of surface 70 and applies the fluid to upper portion 78. After applying a vertical stripe with an upward motion, control module 28 causes AMS 12 to shift laterally along axis Y-Y to apply an adjacent stripe. Nozzle 44 travels downward along support 20 and applies the fluid to surface 70. Actuator 76 causes nozzle 44 to tilt downwards and apply spray fluid to lower portion 80. Nozzle 44 continues to spray as nozzle 44 tilts downward. Nozzle 44 thereby sweeps the fluid spray over lower portion 80 of surface 70 and applies the fluid to lower portion 80. The upward and downward tilting caused by actuator 76 increases the area of wall that nozzle 44 can spray fluid on. Actuator 76 facilitates spraying of the full height of surface 70 by AMS.

FIG. 12 is a schematic block diagram of spray module 16 and actuator 76'. Spray body 42 and nozzle 44 of spray module 16 are shown. Spray body 42 includes grooves 82. Drive 84, shaft 86, and head 88 of actuator 76' are shown. Control module 28 and pivot sensors 92 are also shown.

Nozzle 44 is normally aligned to spray along axis X-X at an orientation orthogonal to surface 68. Nozzle 44 is configured at atomize the spray fluid and generate the desired spray pattern. Actuator 76' is substantially similar to actuator 76 (FIG. 11). Actuator 76' is operatively connected to spray module 16 to tilt spray body 42 upwards, such that nozzle 44 is aligned on axis S1-S1, and downwards, such that nozzle 44 is aligned to spray on axis S2-S2. In the example shown, actuator 76' is an electrically-powered actuator that tilts the nozzle 44 to change the orientation of nozzle 44. Drive 84 is an electric drive, such as a brushed or brushless motor, configured to drive rotation of shaft 86 and head 88 to tilt nozzle 44. In one example, drive 84 is a servo motor. Shaft 86 extends from drive 84 and connects to spray module 16 at interface 90. Head 88 is disposed at an end of shaft 86 and includes teeth configured to interface with grooves 74 formed on spray body 42. As such, interface 90 between spray module 16 and actuator 76' can be a rack and pinion interface. It is understood, however, that interface 90 can be of any type suitable for actuator 76' to cause tilting of nozzle 44. While actuator 76' is described as a rotary actuator, it is understood that actuator 76' can be of any desired form for actively controlling the tilt of nozzle 44. For example, actuator 76' can be a linear actuator configured to drive tilting of nozzle 44. The linear actuator can push and/or pull spray body 42 to tilt nozzle 44. In addition, while actuator 76' is described as electrically powered, it is understood that actuator 76' can be powered in any desired manner, such as pneumatically or hydraulically, among other options.

In some examples, pivot sensors 92 are disposed at opposite ends of support 20 (FIGS. 1B and 11) along axis Z-Z. In some examples, pivot sensors 92 are disposed proximate upper limit L1 (FIG. 11) and lower limit L2 (FIG. 11). Pivot sensors 92 are configured to sense spray module 16 approaching upper limit L1 and lower limit L2. For example, a first transducer component of pivot sensor 92 can be disposed on support 20 and a second transducer component of pivot sensor 92 can be disposed on spray module 16. The first transducer component can be configured to generate a signal and provide the signal to control module 28 based on the first transducer component sensing the presence of the second transducer component. Control module 28 can activate actuator 76' based on control module 28 receiving the signal from the transducer component of pivot sensor 92. For example, pivot sensors 92 can include proximity sensors, distance sensors, limit switches, or sensors of any other type suitable for sensing the presence/location of spray module 16. In one example, a pulley forming part of a belt drive system for actuating spray module 16 vertically includes an encoder that generates information regarding rotations of the pulley and the control module 28 can determine the location of spray module 16 based on that information. In one example, pivot sensors 92 include Hall-effect sensors. It is understood that any desired number of pivot sensors, such as one, two, three, etc., can be utilized to track and determine the location of spray module 16.

Control module 28 can control activation of actuator 76' based on any desired variable. For example, control module 28 can determine the location of nozzle 44 along axis Z-Z based on the drive history of nozzle 44. Control module 28 can recall the drive history from memory 52 (FIGS. 1B and 1C) and/or actively track the position of nozzle 44 throughout spraying and can control actuator 76' based on that tracked position of nozzle 44.

In some examples, the distance at which nozzle 44 is pivoted relative to upper limit L1 and lower limit L2 can vary based on distance D1 between surface 68 and nozzle 44. Control module 28 can cause electric actuator 76' to initiate pivoting prior to spray module 16 reaching upper limit L1 or lower limit L2 and can, in some examples, cause actuator 76' to pivot spray module 16 continuously throughout vertical travel. For example, nozzle 44 can initially be oriented on axis S1-S1 at the beginning of travel and be configured to pivot throughout vertical travel to be aligned on axis S2-S2 at the end of travel. Control module 28 can control pivoting to cause electric actuator 76' to pivot nozzle 44 to any desired angle between a maximum upward angle and a maximum downward angle.

Control module 28 can generate an up-tilt command and provides the up-tilt command to actuator 76 to cause drive 84 to pivot spray body 42 in direction R1 towards axis S1-S1. Nozzle 44 can continue to emit the spray as nozzle 44 tilts from being aligned on axis X-X to being aligned on axis S1-S1. Control module 28 can cause nozzle 44 to stop spraying as nozzle 44 approaches or reaches axis S1-S1. Control module 28 can generate a down-tilt command and provides the down-tilt command to actuator 76' to cause drive 84 to pivot spray body 42 in direction R2 towards axis S2-S2. Nozzle 44 can continue to emit the spray as nozzle 44 tilts from axis X-X to axis S2-S2. In some examples, control module 28 can cause actuator 76' to return nozzle 44 to being aligned on axis X-X after applying the swept spray and prior to AMS 12 reorienting to apply another vertical stripe.

Actuator 76' can orient nozzle 44 along any desired spray axis between axis S1-S1 and axis S2-S2 and can hold nozzle 44 at the desired orientation throughout spraying. While actuator 76' is described as vertically tilting nozzle 44 up and down, it is understood that actuator 76' can be configured to horizontally tilt nozzle 44 left and right in examples where AMS 12 applies horizontal stripes. In some examples, actuator 76' can be configured to rotate nozzle 44 about axis X-X to change from emitting a horizontal spray fan to a vertical spray fan.

Actuator 76' provides significant advantages. Actuator 76' alters the spray orientation of nozzle 44 as nozzle 44 approaches the upper and lower limits of travel L1, L2. Tilting nozzle 44 upward and downward allows nozzle 44 to apply spray on those areas of surface 70 inaccessible to an orthogonally oriented nozzle 44. As such, the user does not have to perform manual painting to cover those areas, thereby saving time and costs. Actuator 76' being an electric actuator allows for precision tilting of nozzle 44 to any desired angle between axis S1-S1 and axis S2-S2.

Figure 13A:
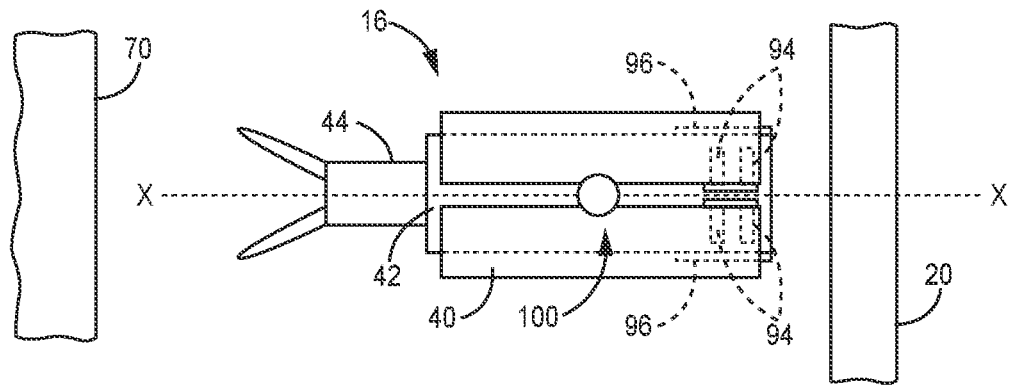
FIG. 13A is a schematic block diagram of a spray module in a normal orientation.
Figure 13B:
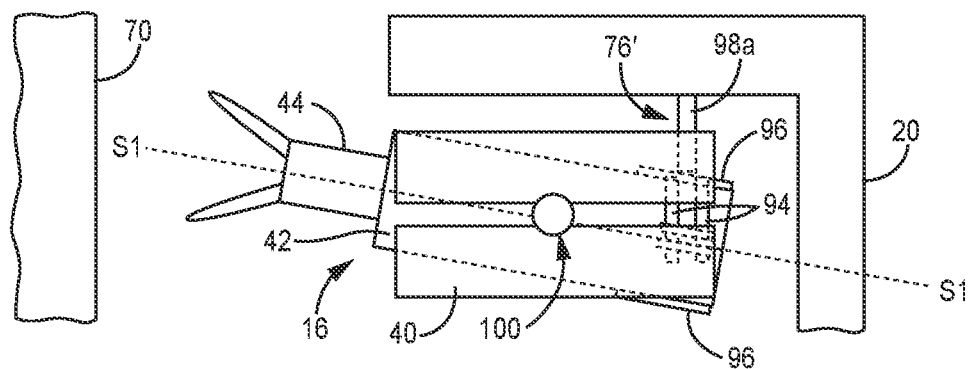
FIG. 13B is a schematic block diagram of a spray module in an upward tilt orientation.
Figure 13C:
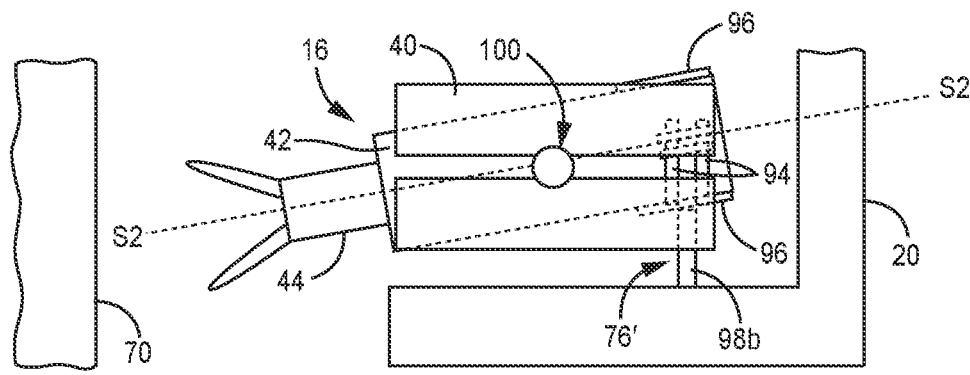
FIG. 13C is a schematic block diagram of a spray module in a downward tilt orientation.

FIG. 13A is a side elevation block diagram showing spray module 16 in a normal orientation. FIG. 13B is a side elevation block diagram of spray module 16 in an upward tilt orientation. FIG. 13C is a side elevation block diagram of spray module 16 in a downward tilt orientation. Spray module 16 includes module housing 40, spray body 42, nozzle 44, elastic members 94, and strike plates 96. Actuator 76" includes projections 98a, 98b. FIGS. 13A-13C will be discussed together.

Projection 98a is disposed proximate an upper end of support 20 and extends into the travel path of spray module 16 along axis Z-Z. Projection 98a is configured to contact spray body 42 to cause nozzle 44 to tilt upward. Projection 98b is disposed proximate a lower end of support 20 and extends into the travel path of spray module 16 along axis Z-Z. It is understood that projection 98b can extend from a portion or support 20 or from base 18. Projection 98b is configured to contact spray body 42 to cause nozzle 44 to tilt downward. While projections 98a, 98b are shown as pins, it is understood that projections 98a, 98b can be of any type suitable for driving nozzle 44 to the tilted orientations. For example, projections 98a, 98b can be ramps, fins, cones, or of any other type suitable for actuating nozzle 44, such as cams, among other options.

Spray body 42 is attached to and supported by module housing 40 at pivot point 100. Pivot point 100 can be formed, for example, by a pin extending from spray body 42 and received in an opening of module housing 40. Elastic members 94 are connected to spray body 42 and module housing 40. Elastic members 94 are configured to return nozzle 44 to the normal orientation, as shown in FIG. 13A. Elastic members 94 can be of any type suitable for stretching in response to nozzle 44 tilting and then returning nozzle 44 to the normal orientation, such as springs, bands, cords, among other options. First and second pairs of elastic members 94 can balance forces to maintain nozzle 44 in the normal orientation. It is understood that spray module 16 can include as many or as few elastic members 94 as desired, such as a single elastic member 94 or paired elastic members 94 on opposite lateral sides of spray module 94.

Strike plates 96 can be mounted on the top and bottom sides of spray body 42 and can be made of a different material than spray body 42, such as a harder material, such as hardened steel, while spray body 42 can be made from a softer material, such as aluminum. Strike plates 96 are directly contacted by pins 98a, 98b to cause tilting of nozzle 44.

During operation, nozzle 44 emits the fluid spray fan. Nozzle 44 travels upward until nozzle 44 encounters actuator 76", and more specifically encounters projection 98a of actuator 76", as shown in FIG. 13B. Projection 98a contacts strike plate 96, physically preventing that portion of nozzle 44 from traveling further upward. Nozzle 44 pivots about pivot point 100 such that nozzle 44 is oriented on axis S1-S1. The first pair of elastic members 94 can cause nozzle 44 to return to the normal orientation shown in FIG. 13A when spray module 16 shifts downwards and the force of projection 98a is removed. Nozzle 44 travels downward until nozzle 44 encounters actuator 76", and more specifically encounters projection 98b of actuator 76", as shown in FIG.

13C. Projection 98*b* contacts strike plate 96, physically preventing that portion of nozzle 44 from traveling further downward. Nozzle 44 pivots about pivot point 100 such that nozzle 44 is oriented on axis S2-S2. The second pair of elastic members 94 cause nozzle 44 to return to the normal orientation shown in FIG. 13A when spray module 16 shifts upwards and the force of projection 98*b* is removed.

Figure 14:
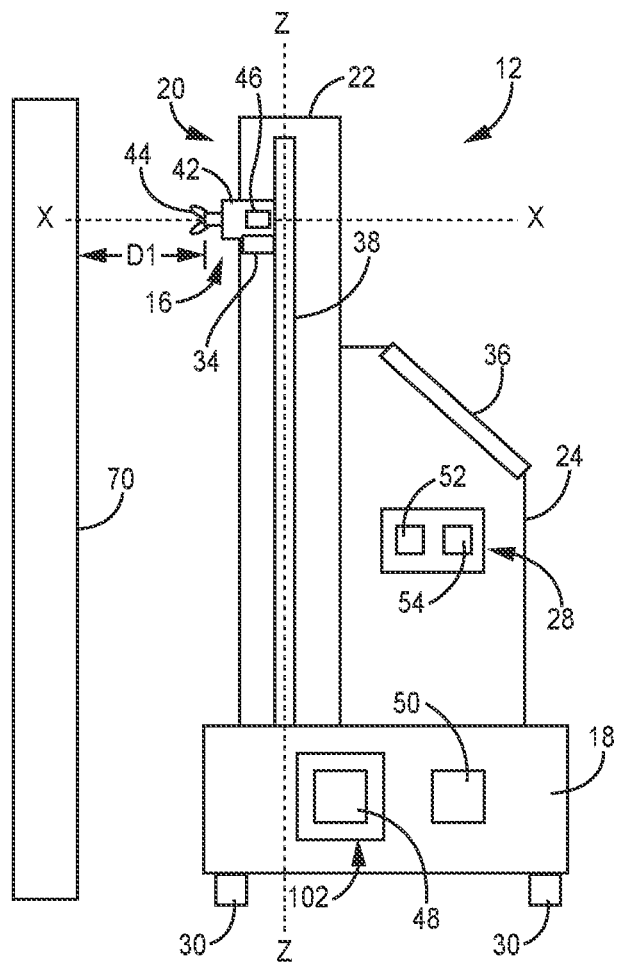
FIG. 14 is a schematic side elevation view of an automated mobile sprayer.

FIG. 14 is a schematic side elevation view of AMS 12 further including overspray mitigation apparatus 102. During operation of AMS 12, not all of the spray emitted by AMS 12 adheres to surface 70. Some of the fluid particles drift in the atmosphere around AMS 12 and can adhere to various exposed surfaces of AMS 12. Those particles can be referred to as "overspray." Any overspray can adhere to distance sensors 48, adversely affecting the operation of those distance sensors 48 and, in some cases, destroying the operability of distance sensors 48 by obscuring the distance sensors 48. The overspray affects the operability of distance sensors 48 by obscuring the sensing components of distance sensors 48. The overspray can adhere to and obscure the sensing components leading to inaccurate results and loss of functionality.

Overspray mitigation apparatus 102 protects distance sensors 48 from the overspray by shielding distance sensors 48 from the overspray. Overspray mitigation apparatus 102 can be configured to protect distance sensors 48 pneumatically, mechanically, and/or electrically, among other options. AMS 12 can include one or more overspray mitigation apparatuses 38 each associated with one or more distance sensors 48. In some examples, each distance sensor 48 includes an associated overspray mitigation apparatus 102.

Control module 28 can control operation of overspray mitigation apparatus 102 based on various operating parameters. For example, control module 28 can control operation of overspray mitigation apparatus 102 based on the relative location of nozzle 44, whether nozzle 44 is/is not actively spraying, the sensing frequency of distance sensor 48, movement of AMS 12, among other operating parameters. In some examples, control module 28 controls operation of distance sensor 48 based, at least in part, on an operating parameter of distance sensor 48, such as the sensing frequency. The sensing frequency of distance sensor 48 is the frequency at which distance sensor 48 emits and receives. For example, a distance sensor 48 with a sensing frequency of 2 hz will emit and receive twice a second. In such an example, control module 28 can control overspray mitigation apparatus 102 such that distance sensor 48 is exposed twice a second in synch with the sensing frequency of distance sensor 48.

Control module 28 can further control operation of overspray mitigation apparatus 102 based on the operating state of AMS 12. For example, distance data is utilized when traversing AMS 12 relative to target surface 68. Control module 28 can maintain overspray mitigation apparatus 102 in the shielding state until the distance data is required. Control module 28 can cause overspray mitigation apparatus 102 to actuate to the sensing state based on impending movement of AMS 12. Distance sensors 48 are thus exposed and can generate distance data. In some examples, control module 28 can maintain overspray mitigation apparatus 102 in the sensing state as AMS 12 shifts positions. In other examples, control module 28 receives the distance data and overspray mitigation apparatus 102 shifts back to the shielding state. Control module 28 then causes AMS 12 to move approximately the desired distance, which distance can be determined based on data from other sensors, such as navigation sensors 50 or sensors associated with rotation of wheels 30, among other options. Control module 28 can confirm that AMS 12 has shifted the desired distance by again causing overspray mitigation apparatus 102 to shift to the sensing state and can resume spraying or reposition AMS 12 to the desired position based on the distance data.

Control module 28 can further control operation of overspray mitigation apparatus 102 based on whether overspray is present relative to the location of distance sensor 48. Control module 28 knows the location of each distance sensor 48 on AMS 12, knows the location of nozzle 44, and knows when nozzle 44 is emitting the fluid spray. Control module 28 can maintain overspray mitigation apparatus 102 in the shielding state when overspray is expected to be present, such as for a set time period after nozzle 44 emits the spray fluid. The time period can vary based on the location of nozzle 44 relative to that distance sensor 48. For example, the time period can be longer when nozzle 44 is further away from distance sensor 48, as the overspray will take longer to drift to distance sensor 48, and shorter when nozzle 44 is closer to distance sensor 48. In some examples, overspray mitigation apparatus 102 is in the shielding state whenever nozzle 44 is emitting fluid. In other examples, control module 28 can implement a time delay between nozzle 44 beginning spraying and causing overspray mitigation apparatus 102 to enter the shielding state. The time period can be longer when nozzle 44 is further away from distance sensor 48, as the overspray will take longer to drift to distance sensor 48, and shorter when nozzle 44 is closer to distance sensor 48.

While overspray mitigation apparatus 102 is discussed in the context of AMS 12, it is understood that overspray mitigation apparatus 102 can be utilized to mitigate overspray in any environment susceptible to overspray. Overspray mitigation apparatus 102 can be utilized in other applications where overspray is present.

Overspray mitigation apparatus 102 provides significant advantages. Overspray mitigation apparatus 102 prevents overspray from reaching and adversely affecting the operation of distance sensors 48. Overspray mitigation apparatus 102 protects distance sensor 48 thereby facilitating the user of various sensors that are more susceptible to overspray, such as optical sensors. Optical sensors can provide greater range and more accurate readings as compared to other forms of sensors that are less susceptible to overspray.

Figure 15A:
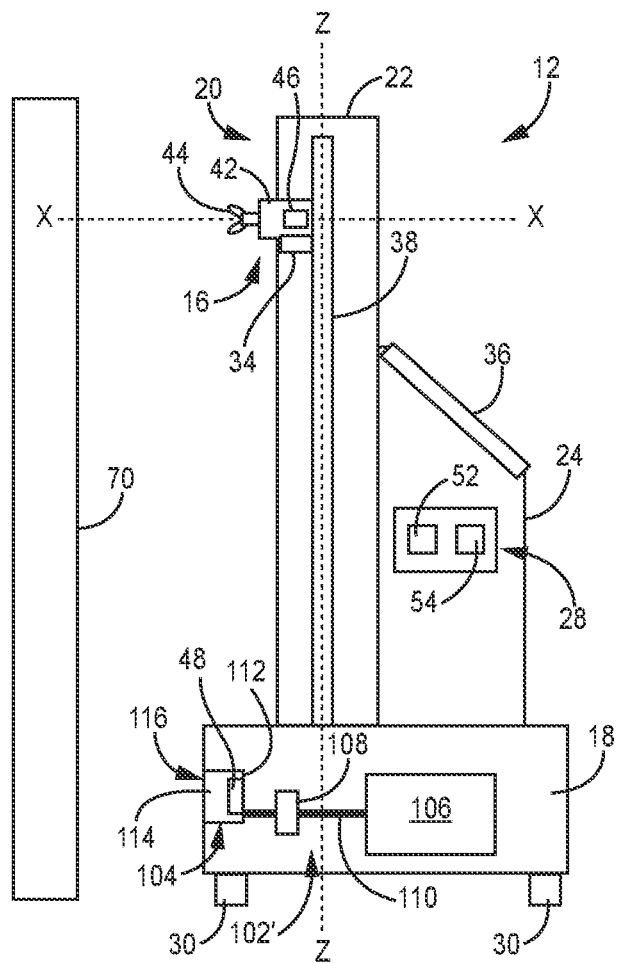
FIG. 15A is a schematic side elevation view of an automated mobile sprayer.
Figure 15B:
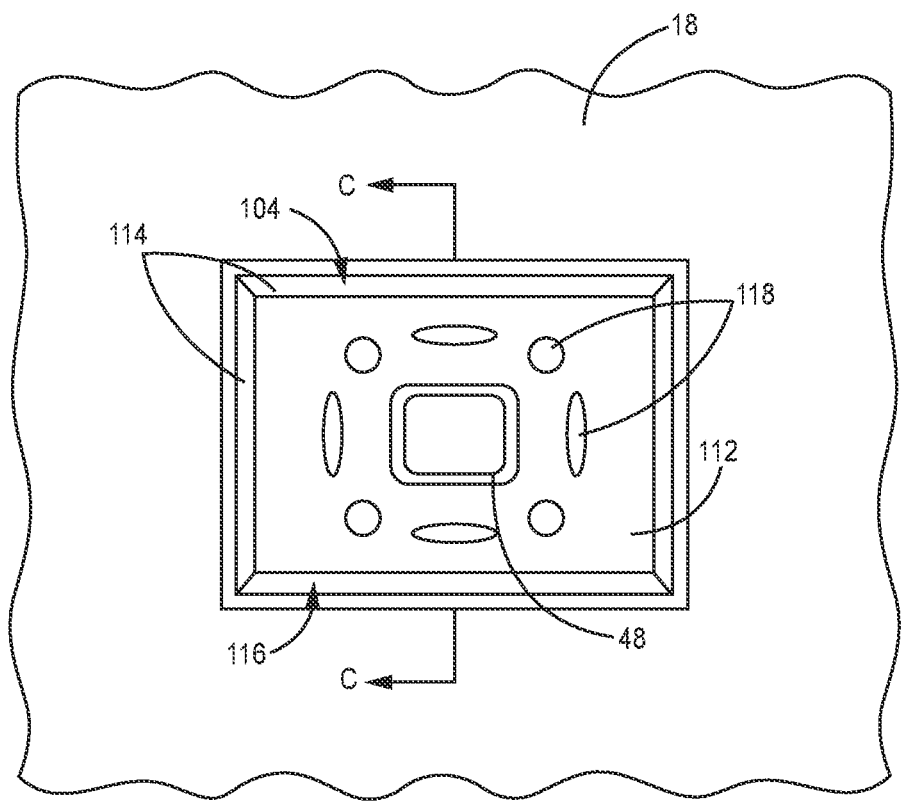
FIG. 15B is a front elevation view of a portion of an automated mobile sprayer.
Figure 15C:
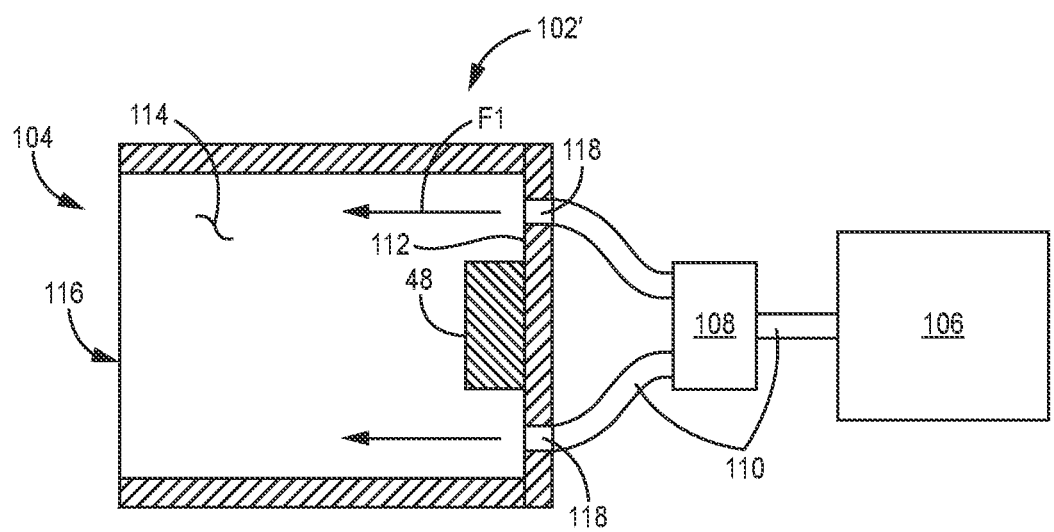
FIG. 15C is a cross-sectional view taken along line C-C in FIG. 15B.

FIG. 15A is a block elevation view of AMS 12. FIG. 15B is a front elevation view of a portion of base 18. FIG. 15C is a cross-sectional view taken along line C-C in FIG. 15B. FIGS. 15A-15C will be discussed together. Overspray mitigation apparatus 102' includes chamber 104, air supply 106, filter 108, and air passage 110. Chamber 104 includes back wall 112, side walls 114, and open end 116. Openings 118 (FIGS. 15B and 15C) are formed in back wall 112.

Overspray mitigation apparatus 102' is substantially similar to overspray mitigation apparatus 102 (FIG. 14) and can be operated in accordance with any of the techniques discussed herein. Overspray mitigation apparatus 102' is disposed on AMS 12. Air supply 106 is disposed on to provide a flow of pressurized air to chamber 104. In some examples, air supply 106 can be activated and deactivated by control module 28. For example, air supply 106 can be an air compressor disposed on AMS 12 or include one or more tanks of compressed air connected to chamber 104. In examples where air supply 106 includes tanks of compressed air, filter 108 may not be present as the air in the tanks is not contaminated with overspray.

Air passage 110 provides a flowpath for the compressed air to flow from air supply 106 to chamber 104. One or more air passages 110 can be fluidly connected to one or more of openings 118. Chamber 104 can be a tube with only one end open. Chamber 104 can have a cylindrical inner profile. Distance sensor 48 is disposed at an opposite end of the tube from the open end.

In some examples, overspray mitigation apparatus 102' does not include air flow through chamber 104. Instead, distance sensor 48 is disposed in chamber 104 and the air normally within chamber provides a cushion to prevent overspray from entering chamber 104 and reaching distance sensor 48. Examples of a minimum depth of chamber (from lip of opening of the funnel to sensor) can be at least 1 inch, at least 2 inches, at least 3 inches, or more.

Openings 118 are formed in back wall 112 of chamber 104 and allow the compressed air to enter chamber 104. Openings 118 can include elongated openings and circular openings or can all be of the same configuration, such as all elongated or circular openings. Openings 118 can additionally or alternatively be formed through side walls 114 and be oriented to blow air towards open end 116 of chamber 104 and/or be disposed proximate the open end 116 of chamber 104 to blow air laterally or vertically across open end 116 to create a curtain of air that discourages migration of overspray into chamber 104.

As shown by flow lines F1, the compressed air enters chamber 104 through openings 118, flows through chamber, and is ejected out of open end 116 of chamber 104 to blow the overspray away from chamber 104 and distance sensor 48. The compressed airflow can further generate turbulence in chamber 104 that causes the overspray that does enter chamber 104 to either reverse course and flow out of chamber 104 or adhere to side walls 114 of chamber prior to reaching distance sensor 48.

Figure 16A:
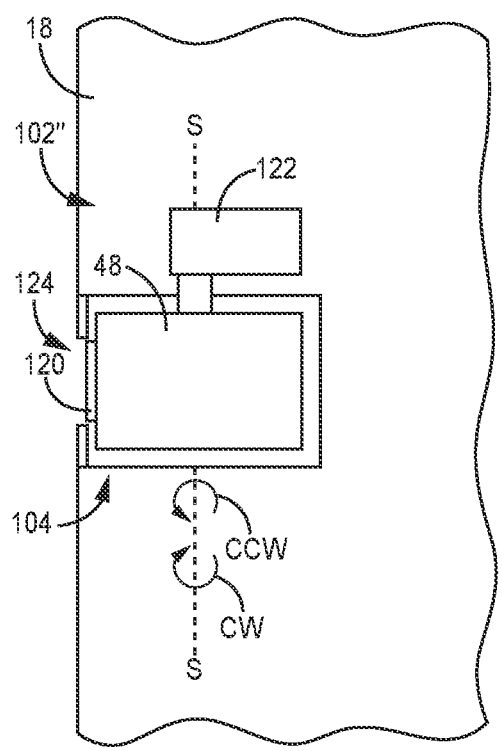
FIG. 16A is a block diagram of an overspray mitigation assembly in a sensing state.
Figure 16B:
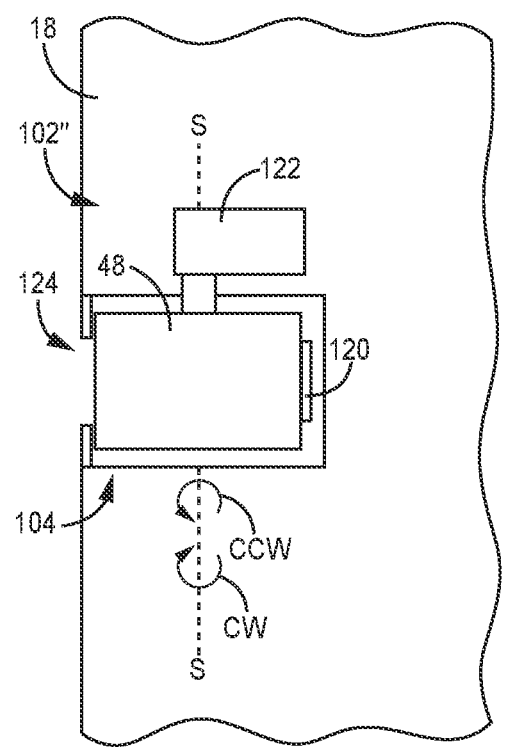
FIG. 16B is a block diagram of an overflow mitigation assembly in a shielding state.

FIG. 16A is a block diagram of overspray mitigation apparatus 102" in a sensing state. FIG. 16B is a block diagram of overspray mitigation apparatus 102" in a shielding state. FIGS. 16A and 16B will be discussed together. Overspray mitigation apparatus 102" includes chamber 104 and actuator 122.

Overspray mitigation apparatus 102" is substantially similar to overspray mitigation apparatus 102 (FIG. 14) and overspray mitigation apparatus 102' (FIGS. 15A-15C) and can be operated in accordance with any of the techniques discussed herein. Aperture 124 is disposed at the open end of chamber 104. Aperture 124 provides an opening through which distance sensor 48 can emit and receive and reduces the area through which overspray can enter chamber 104. In some examples, a plate including aperture 124 can be removably placed at the open end of chamber 104 to enclose chamber 104.

Actuator 122 is operatively connected to distance sensor 48 and is configured to rotate distance sensor 48 about axis S-S. Axis S-S can be a vertical axis, similar to vertical axis Z-Z, a lateral axis, similar to lateral axis Y-Y, or a longitudinal axis, similar to longitudinal axis X-X, or of any other desired orientation. Control module 28 is operatively connected to actuator 122, either electrically or communicatively, to control operation of actuator 122. In one example, actuator 122 continuously rotates distance sensor 48 throughout operation. Control module 28 can cause actuator 122 to rotate distance sensor 48 based on operating parameters of distance sensor 48 and operating parameters of AMS 12.

Actuator 122 can be of any type suitable for driving rotation of distance sensor 48. For example, actuator 122 can be an electric motor, such as a servo motor, among other options. Actuator 122 can be configured to continuously rotate distance sensor 48 in one of the clockwise direction CW and the counterclockwise direction CCW. In other examples, actuator 122 is configured to oscillate distance sensor 48 between the sensing state, shown in FIG. 16B, and the shielded state, shown in FIG. 16C. It is understood that the protected state can be include any degree of rotation suitable to shield sensor interface 120, which is the portion of distance sensor 48 by which distance sensor 48 can emit and/or receive, within chamber 104. In some examples, distance sensor 48 is in the shielded state for the majority of the operating time, with distance sensor 48 exposed for only a small portion of time, such as one second or less, soon before spraying is initiated. In some examples, distance sensor 48 is in the shielded state during spraying and when AMS 12 is not moving and can be in the shielded state for some or a majority of the time AMS 12 is shifting positions.

Control module 28 can control actuation of distance sensor 48 between the sensing state and the protected state based on any desired parameter. For example, control module 28 can control actuation based on the sensing frequency of distance sensor 48, based on the operating state of AMS 12, and/or based on whether overspray is present relative to the location of distance sensor 48. For example, actuator 122 can rotate distance sensor 48 such that distance sensor 48 is in the sensing state two times a second where distance sensor has a sensing frequency of 2 hz.

Figure 17:
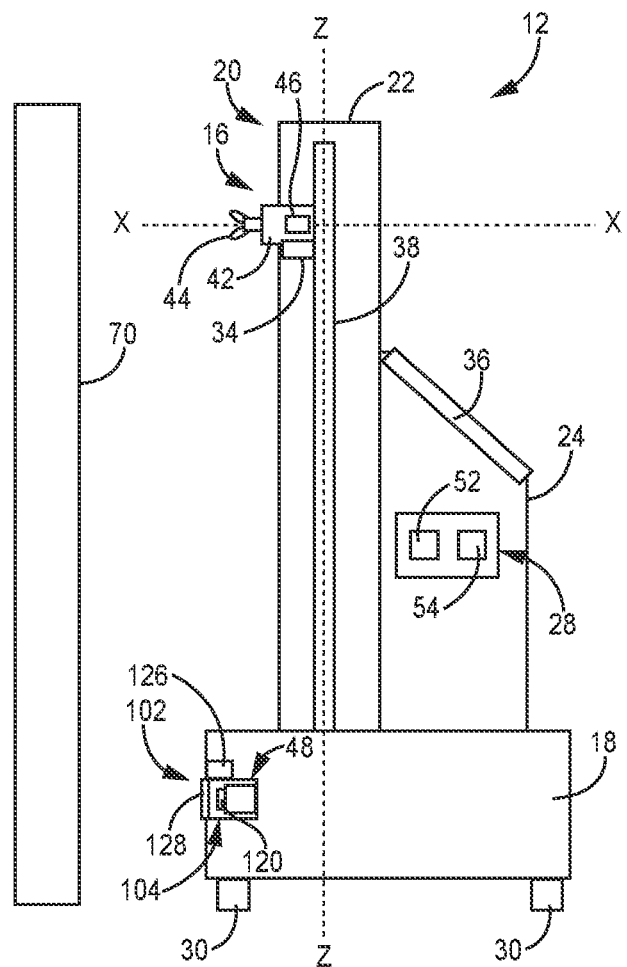
FIG. 17 is a schematic side elevation view of an automated mobile sprayer.

FIG. 17 is a block elevation view of AMS 12 with overspray mitigation apparatus 102''''. Overspray mitigation apparatus 102'''' is substantially similar to overspray mitigation apparatus 102 (FIG. 14), overspray mitigation apparatus 102' (FIGS. 15A-15C), and overspray mitigation apparatus 102" (FIGS. 16A-16C) and can be operated in accordance with any of the techniques discussed herein. Overspray mitigation apparatus 102'''' includes chamber 104, actuator 126, and shutter 128.

Shutter 128 is disposed at the open end 116 of chamber 104 and is moveable between a closed state and an open state. With shutter 128 in the closed state, overspray mitigation apparatus 102'''' is in the shielding state. With shutter 128 in the open state, overspray mitigation apparatus 102'''' is in the sensing state. Actuator 126 is operatively connected to shutter 128 to actuate shutter 128 between the closed state and the open state. Shutter 128 can be of any desired configuration suitable for isolating distance sensor 48 from the environment outside of chamber 104 when in the closed state. For example, shutter 128 can be hinged, sliding, rotating, pivoting, or of any other suitable configuration.

Control module 28 is operatively connected to actuator 126, either electrically or communicatively, to control operation of actuator 126 and thereby control movement of shutter 128. Control module 28 can control actuation of shutter 128 based on any desired parameter. For example, control module 28 can control operation of shutter 128 based on the sensing frequency of distance sensor 48, based on the operating state of AMS 12, and/or based on whether overspray is present relative to the location of distance sensor 48. In some examples, control module 28 can control the operation of distance sensor 48 and shutter 128. For example, control module 28 can activate distance sensor 48 when distance data is needed, such as when shifting the position of AMS 12. Control module 28 can cause shutter 128 to open and activate distance sensor 48 and can cause shutter 128 to close and deactivate distance sensor 48. In some examples, distance sensor 48 is configured to continuously generate distance data throughout operation. In such an example, distance sensor 48 will generate distance data even when shutter 128 is closed. The distance data when shutter 128 is closed will indicate a very small distance. Control module 28 can be configured to filter any distance data falling below a threshold and classify that distance data as noise that can be ignored. The threshold can be set at a distance exceeding the distance between sensor interface 120 and shutter 128. The control module 28 can classify any distance data indicating a distance greater than the threshold as a true distance and utilize that true distance during operation of AMS 12.

Figure 18:
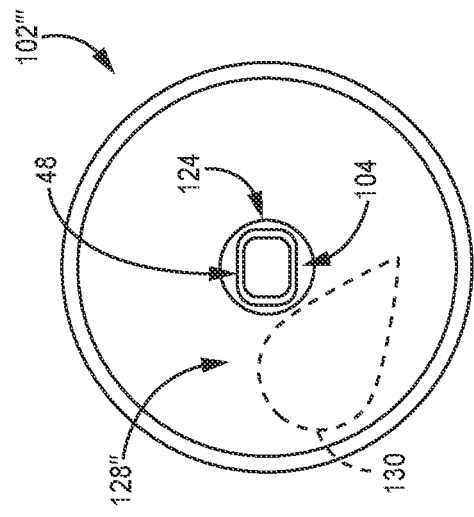
FIG. 18 is a schematic front view of an overspray mitigation assembly.

FIG. 18 is a schematic front view of overspray mitigation apparatus 102'''. Chamber 104 and shutter 128' of overspray mitigation apparatus 102''' are shown. Shutter 128' includes blades 130. Shutter 128' is shown in the open state. Shutter 128' is substantially similar to shutter 128 (FIG. 17) and can be operated in accordance with any of the techniques discussed herein. Blades 130 define aperture 124 when shutter 128' is in the open state. Distance sensor 48 can emit and receive through aperture 124 to generate the distance data. Blades 130 slide over one another as shutter 128' shifts between the open state and the closed state. Blades 130 can be shifted by varying degrees to control the size of aperture 124.

Figure 19:
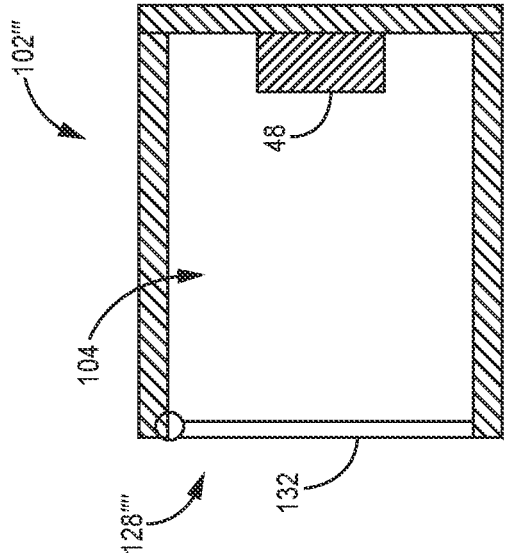
FIG. 19 is a schematic front view of an overspray mitigation assembly.

FIG. 19 is a schematic front view of overspray mitigation apparatus 102'''. Chamber 104 and shutter 128'' of overspray mitigation apparatus 102''' are shown. Shutter 128'' includes blade 130'. Shutter 128'' is shown in the open state. Shutter 128'' is substantially similar to shutter 128 (FIG. 17) and shutter 128' (FIG. 18) and can be operated in accordance with any of the techniques discussed herein. In some examples, an aperture plate including aperture 124 can be placed over the chamber housing distance sensor 48. Blade 130' is disposed proximate aperture 124 and is configured to pivot between the open state, where blade 130' does not cover aperture 124, and the closed state, where blade 130' covers aperture 124. With blade 130' covering aperture 124 the overspray cannot flow through aperture 124 to distance sensor 48. Blade 130' can, in some examples, be normally-closed and actuated to the open state. Blade 130' can be configured to return to the closed state upon removal of the force holding blade 130' in the open state. For example, a solenoid or other suitable actuator can pivot blade 130' to the open state and a spring or other return mechanism can return blade 130' to the closed state upon removal of power from the actuator. In other examples, blade 130' can be actively driven both from the open state to the closed state and from the closed state to the open state. In some examples, blade 130' can be normally-open and actuated to the closed state.

Figure 20:
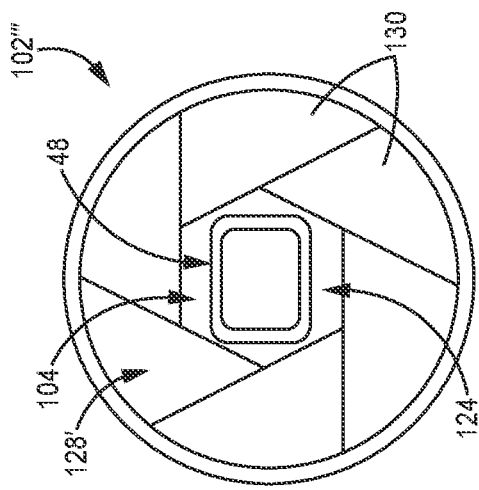
FIG. 20 is a schematic front view of an overspray mitigation assembly.

FIG. 20 is a schematic front view of overspray mitigation apparatus 102'''. Chamber 104 and shutter 128''' of overspray mitigation apparatus 102''' are shown. Shutter 128''' includes doors 132. Shutter 128''' is shown in the open state. Shutter 128''' is substantially similar to shutter 128 (FIG. 17), shutter 128' (FIG. 18), and shutter 128'' (FIG. 19) and can be operated in accordance with any of the techniques discussed herein. Doors 132 define aperture 124 when shutter 128''' is in the open state. Doors 132 enclose distance sensor 48 within chamber 104 when shutter 128' is in the closed state. Distance sensor 48 can emit and receive through aperture 124 to generate the distance data. Doors 132 slide away from each other to open aperture 124. While shutter 128' is shown as including two doors 132, it is understood that shutter 128''' can include more or fewer than two doors 132.

Figure 21:
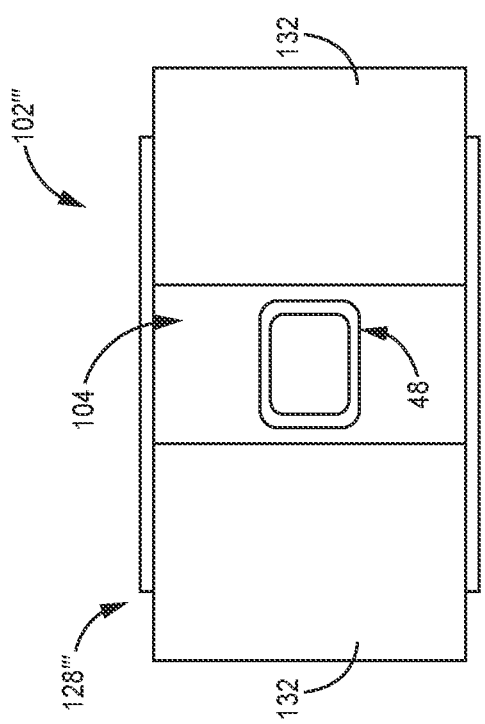
FIG. 21 is a schematic cross-sectional view of an overspray mitigation assembly.

FIG. 21 is a schematic cross-sectional view of overspray mitigation apparatus 102'. Chamber 104 and shutter 128'''' of overspray mitigation apparatus 102''' are shown. Distance sensor 48 is shown. Shutter 128'' includes door 132. Shutter 128'''' is substantially similar to shutter 128 (FIG. 17), shutter 128' (FIG. 18), shutter 128'' (FIG. 19), and shutter 128' (FIG. 20) and can be operated in accordance with any of the techniques discussed herein. Door 132 is disposed proximate the open end of chamber 104 and is configured to pivot between open and closed. Door 132 can be configured to swing into chamber 104 or out of chamber 104. While shutter 128'''' is shown as including a single door 132, it is understood that shutter 128'''' can be formed by more than one door 132.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An automated mobile sprayer (AMS) configured to spray fluids onto a target surface, the AMS comprising:
    a mobile base having a lateral axis and a longitudinal axis;
    a spray module supported by the mobile base, the spray module movable vertically relative to the target surface, the spray module including a nozzle configured to spray the fluid towards the target surface;
    at least one sensor configured to generate data profiling the target surface; and
    a control module having control circuitry and a memory, wherein a maneuver library including a plurality of different transition maneuvers is stored in the memory, wherein each transition maneuver of the plurality of transition maneuvers comprises a predetermined sequence of turning and spraying steps, the control module configured to:
        receive the data from the at least one sensor;
        detect a transition in the target surface based on the data, the transition being between walls of the target surface;
        identify a transition type of the transition as one of a plurality of transition types stored in the memory;
        select a first transition maneuver from the plurality of different transition maneuvers stored in the maneuver library based on the identification of the transition type of the transition and based on the identified transition type being associated with the first transition maneuver; and
        control movement of the AMS and spraying by the AMS relative to the transition based on the identification of the transition type of the transition and by executing the first transition maneuver selected from the maneuver library.

2. The AMS of claim 1, wherein the at least one sensor comprises a distance sensor.

3. The AMS of claim 2, wherein the distance sensor includes at least one of:
    a front sensor configured to generate a front distance data and oriented laterally;
    a wall sensor configured to generate spacing distance data and oriented longitudinally; and
    at least one corner sensor configured to generate corner distance data and oriented intermediate a travel path of the AMS and the target surface.

4. The AMS of claim 3, wherein the at least one corner sensor includes a first corner sensor and a second corner sensor, and wherein the first corner sensor is oriented on a first angled axis and the second corner sensor is oriented on a second angled axis different than the first angled axis.

5. The AMS of claim 2, further comprising:
a navigation sensor configured to generate navigation data;
wherein the control circuitry is configured to:
drive the AMS via the drive system along the target surface based on distance data from the at least one sensor,
control the spray module in spraying the target surface,
detect a void in the target surface based on the distance data, and
drive the AMS via the drive system along the void based on the navigation data from the navigation sensor.

6. The AMS of claim 1, wherein the control module is configured to:
identify the transition as one of an inside transition and an outside transition;
select an inside transition maneuver of the plurality of different transition maneuvers based on the transition being identified as the inside transition; and
select an outside transition maneuver of the plurality of different transition maneuvers based on the transition being identified as the outside transition.

7. The AMS of claim 1, wherein the control module is further configured to:
control movement of the AMS and spraying by the AMS based on a wall follow routine wherein a distance between the AMS and the target surface is maintained;
stop controlling movement of the AMS according to the wall follow routine based on the AMS encountering the transition; and
control movement of the AMS and spraying by the AMS according to the wall follow routine after completing the transition maneuver.

8. The AMS of claim 1, wherein the transition maneuver is an inside maneuver, the inside maneuver including:
applying a final orthogonal stripe to a first surface;
pivoting the AMS away from the first surface such that the nozzle is oriented towards an intersection between the first surface and a second surface; and
applying a fluid stripe at the intersection.

9. The AMS of claim 1, wherein the transition maneuver is an outside maneuver, the outside maneuver including:
determining a location of an end of a first surface based on the data generated by the at least one sensor; and
pivoting the AMS into a transition opening and towards a second surface intersecting with the first surface at the end of the first surface.

10. The AMS of claim 9, wherein the outside maneuver further includes:
stopping pivoting based on data generated by the at least one sensor.

11. The AMS of claim 10, wherein the outside maneuver further includes:
applying a fluid stripe at an intersection between the first surface and the second surface.

12. The AMS of claim 10, wherein the outside maneuver further includes:
applying a fluid stripe to the second surface at an end of the second surface intersecting with the end of the first surface.

13. The AMS of claim 1, wherein the control module is configured to control movement of the AMS and spraying by the AMS relative to a corner by:
spraying orthogonal to a first surface;
applying one or more swaths of fluid into the corner between the first surface and a second surface; and
transitioning the AMS to being aligned on the second surface intersecting with the first surface to spray orthogonal to the second surface.

14. The AMS of claim 1, wherein the control module is configured to control movement of the AMS and spraying by the AMS such that the AMS applies fluid orthogonal to the target surface except for one or more fluid swaths spraying into a corner between surfaces when the AMS is not orthogonal to the target surface but instead transitioning between surfaces.

15. The AMS of claim 1, wherein the at least one sensor is a navigation sensor and the control module is configured to control movement of the AMS relative to the transition based at least in part on orientation data from the navigation sensor.

16. The AMS of claim 15, wherein the control module is configured to drive the AMS beyond an edge of the target surface at the transition.

17. The AMS of claim 1, further comprising:
an actuator interfacing with the nozzle to tilt the nozzle from a normal orientation to an angled orientation relative to the normal orientation;
wherein the actuator is configured to tilt the nozzle from the normal orientation to an upward orientation to apply spray fluid to a portion of the target surface disposed above an upper travel limit and is further configured to tilt the nozzle from the normal orientation to a downward orientation to apply spray fluid to a portion of the target surface disposed below the lower travel limit; and
wherein the actuator is configured to continuously tilt the nozzle from the upward orientation to the downward orientation as the nozzle travels from the upper travel limit to the lower travel limit.

18. An autonomous mobile sprayer (AMS) configured to spray fluids onto a target surface, the AMS comprising:
a mobile base having a lateral axis and a longitudinal axis;
a spray module supported by the mobile base, the spray module movable vertically relative to the target surface, the spray module including a nozzle configured to spray the fluid towards the target surface;
at least one sensor configured to generate data profiling the target surface; and
a control module configured to:
receive the data from the at least one sensor;
detect a transition in the target surface based on the data;
identify a transition type of the transition as one of a plurality of transition types stored in a memory;
select a transition maneuver from a maneuver library comprising a plurality of different transition maneuvers, wherein the selection is based on the identification of the transition type of the transition; and
control movement of the AMS and spraying by the AMS relative to the transition based on the identification of the transition type of the transition;
wherein the at least one sensor is a navigation sensor and the control module is configured to control movement of the AMS relative to the transition based at least in part on orientation data from the navigation sensor;

wherein the control module is further configured to:
- determine an actual degree of rotation of the mobile base of the AMS based on the orientation data;
- compare the degree of rotation to a maximum allowable degree of rotation of the mobile base; and
- control pivoting of the mobile base of the AMS relative to the transition based on a comparison of the actual degree of rotation of the mobile base and the maximum allowable degree of rotation of the mobile base.

\* \* \* \* \*